(12) United States Patent
Kim

(10) Patent No.: US 10,200,710 B2
(45) Date of Patent: *Feb. 5, 2019

(54) MOTION VECTOR PREDICTION METHOD AND APPARATUS FOR ENCODING OR DECODING VIDEO

(71) Applicant: SAMSUNG ELECTRONICS CO., LTD., Suwon-si (KR)

(72) Inventor: Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/412,556

(22) PCT Filed: Jul. 2, 2013

(86) PCT No.: PCT/KR2013/005866
§ 371 (c)(1),
(2) Date: Jan. 2, 2015

(87) PCT Pub. No.: WO2014/007521
PCT Pub. Date: Jan. 9, 2014

(65) Prior Publication Data
US 2015/0195558 A1    Jul. 9, 2015

Related U.S. Application Data

(60) Provisional application No. 61/667,133, filed on Jul. 2, 2012.

(51) Int. Cl.
*H04N 19/533* (2014.01)
*H04N 19/513* (2014.01)
(Continued)

(52) U.S. Cl.
CPC ........... *H04N 19/513* (2014.11); *H04N 19/56* (2014.11); *H04N 19/58* (2014.11)

(58) Field of Classification Search
CPC ................... H04N 19/00684; H04N 19/00587
See application file for complete search history.

(56) References Cited

U.S. PATENT DOCUMENTS 8,532,184 B2    9/2013  Koo et al.
8,855,200 B2   10/2014  Koo et al.
(Continued)

FOREIGN PATENT DOCUMENTS

CN         1455598 A      11/2003
CN       102045557 A       5/2011
(Continued)

OTHER PUBLICATIONS

Lim et al. "High-level syntax: MVP scaling issue for LTRPs", JCTVC-10422, JCT-VC 9th Meeting, Apr. 27,-May 7, 2012.*
(Continued)

*Primary Examiner* — Mohammed S Rahaman
(74) *Attorney, Agent, or Firm* — Sughrue Mion, PLLC

(57) ABSTRACT

Provided are a motion vector predicting method and an apparatus for encoding and decoding a video. The motion vector prediction method includes: determining, from neighboring blocks of the current block, a plurality of candidate blocks that are referred to so as to predict a motion vector of a current block; determining a candidate motion vector of a first candidate block among the determined plurality of candidate blocks, based on whether a reference image of the first candidate block and a reference image of the current block are long-term reference images; and determining the motion vector of the current block by using a candidate motion vector list including the determined candidate motion vector of the first candidate block and candidate
(Continued)

motion vectors from remaining candidate blocks among the determined plurality of candidate blocks.

2 Claims, 22 Drawing Sheets

(51) Int. Cl.
*H04N 19/56* (2014.01)
*H04N 19/58* (2014.01)

(56) References Cited

U.S. PATENT DOCUMENTS

| | | |
|---|---|---|
| 9,106,889 B2 | 8/2015 | Jeon |
| 2003/0206589 A1 | 11/2003 | Jeon |
| 2008/0089416 A1 | 4/2008 | Jeon |
| 2010/0135390 A1 | 6/2010 | Tourapis et al. |
| 2011/0001642 A1 | 1/2011 | Yu et al. |
| 2011/0013697 A1* | 1/2011 | Choi ............... H04N 19/105 375/240.16 |
| 2011/0090957 A1 | 4/2011 | Liao et al. |
| 2011/0142133 A1 | 6/2011 | Takahashi et al. |
| 2011/0176615 A1 | 7/2011 | Lee et al. |
| 2012/0008688 A1 | 1/2012 | Tsai et al. |
| 2012/0121021 A1 | 5/2012 | Jung et al. |
| 2012/0155540 A1 | 6/2012 | Jagannathan |
| 2012/0163466 A1 | 6/2012 | Sugio et al. |
| 2012/0163467 A1 | 6/2012 | Kim et al. |
| 2013/0107963 A1* | 5/2013 | Wahadaniah ......... H04N 19/52 375/240.16 |
| 2013/0114741 A1* | 5/2013 | Sullivan ............... H04N 19/70 375/240.25 |
| 2013/0259129 A1 | 10/2013 | Sato |
| 2013/0336407 A1* | 12/2013 | Chen ................... H04N 19/597 375/240.16 |
| 2014/0133563 A1 | 5/2014 | Jung et al. |
| 2016/0219300 A1 | 7/2016 | Jeon |

FOREIGN PATENT DOCUMENTS

| | | |
|---|---|---|
| GB | 2 388 267 B | 8/2004 |
| JP | 2003-333602 A | 11/2003 |
| JP | 2008-211697 A | 9/2008 |
| JP | 2008-245016 A | 10/2008 |
| KR | 10-0491530 B1 | 5/2005 |
| KR | 10-2008-0050349 A | 6/2008 |
| KR | 10-2008-0077942 A | 8/2008 |
| KR | 10-2009-0113281 A | 10/2009 |
| KR | 10-0985379 B1 | 10/2010 |
| KR | 10-2011-0017783 A | 2/2011 |
| KR | 10-2011-0085896 A | 7/2011 |
| RU | 2395174 C1 | 7/2010 |
| TW | I365610 B | 6/2012 |
| WO | 2010/041855 A2 | 4/2010 |
| WO | 2012/086461 A1 | 6/2012 |
| WO | 2013/168407 A1 | 11/2013 |

OTHER PUBLICATIONS

Communication dated Jun. 9, 2015 by the Japanese Patent Office in related Application No. 2015-520054.
Communication dated Aug. 4, 2015 by the Korean Intellectual Property Office in related Application No. 10-2014-0054462.
Communication dated Jun. 19, 2015 by the Australian Intellectual Property Office in related Application No. 2013285749.
Takahashi et al., "High-level Syntax: Motion vector prediction issue for long-term reference picture", Joint Collaborative Team on Video Coding (JCT-VC) of ITU-T SG 16 WP 3 and ISO/IED JTC 1/SC 29/WG 11 10th meeting, Jun. 29, 2012, JCTVC-J0071, Version 1, 8 total pages, retrieved from <http://phenix.int-evry.fr/jct/doc_end_user/current_document.php?id=5934>.
Lim et al., "High-level Syntax: MVP scaling issue for LTRPS", Joint Collaborative Team on Video Coding (JCT-VC) of ITU-T SG 16 WP 3 and ISO/IEC JTC 1/SC 29/WG 11 9th meeting; Apr. 28, 2012, JCTVC-I0422, Version 2, 7 total pages, retrieved from <http://phenix.int-evry.fr/jct/doc_end_user/current_document.php?id=5934>, Cited in comm. dated Jun. 9, 2015 in 2015-520054.
Kim et al., "Restricted usage of motion vectors for long-term reference picture in motion vector prediction process", Joint Collaborative Team on Video Coding (JCT-VC) of ITU-T SG 16 WP 3 and ISO/IEC JTC 1/SC 29/WG 11 10th Meeting, Jul. 11, 2012, JCTV-J0302, Version 2, 16 total pages, retrieved from <http://phenix.int-evry.fr/jct/doc_end_user/current_document.php?id=6165>, Cited in comm. dated Jun. 9, 2015 in 2015-520054.
Kim et al., "Cross-verification on motion vector prediction issue for long-term reference picture (JCTVC-J0071)", Joint Collaborative Team on Video Coding (JCT-VC) of ITU-T SG 16 WP 3 and ISO/IEC JTC 1/SC 29/WG 11 10th Meeting, Jul. 20, 2012, JCTV-J0356, 2 total pages, Cited in comm. dated Jun. 9, 2015 in 2015-520054.
Wiegand, "Working Draft No. 2, Revision 2 (WD-2)", Joint Video Team (JVT) of ISO/IEC MPEG and ITU-T VCEG, Jan. 29-Feb. 1, 2002, 106 pages total.
Bossen, "Common Test Conditions and Software Reference Configurations", Joint Collaborative Team on Video Coding (JCT-VC) of ITU-T SG16 WP3 and ISO/IEC JTC1/SC29/WG11, Apr. 27-May 7, 2012, 3 pages total.
Kim, et al.; "Restriction on Motion Vector Scaling for Merge and AMVP", Joint Collaborative Team on Video Coding (JCT-VC) of ITU-T SG16 WP3 and ISO/IEC JTC1/SC29/WG11, Nov. 21-30, 2011, 4 pages total.
Lim, et al.; "High-Level Syntax: MVP Scaling Issue for LTRPs", Joint Collaborative Team on Video Coding (JCT-VC) of ITU-T SG16 WP3 and ISO/IEC JTC1/SC29/WG11, Apr. 27-May 7, 2012, 5 pages total.
Bross, et al.; "High Efficiency Video Coding (HEVC) Text Specification Draft 7", Joint Collaborative Team on Video Coding (JCT-VC) of ITU-T SG16 WP3 and ISO/IEC JTC1/SC29/WG11, Apr. 27-May 7, 2012, 282 pages total.
Search Report dated Oct. 17, 2013, issued by the International Searching Authority in counterpart International Application No. PCT/KR2013/005866.
Written Opinion dated Oct. 17, 2013, issued by the International Searching Authority in counterpart International Application No. PCT/KR2013/005866.
Communication dated May 12, 2014, issued by the Korean Intellectual Property Office in counterpart Korean Application No. 10-2013-0077303.
Communication dated Aug. 19, 2014, issued by the Korean Intellectual Property Office in counterpart Korean Application No. 10-2013-0077303.
Communication dated Dec. 1, 2015 issued by the Japanese Patent Office in counterpart Japanese Patent Application No. 2015-520054.
Yue Yu, et al., "The Improvements on Reference Picture Buffering and List Construction", Joint Collaborative Team on Video Coding (JCT-VC) of ITU-T SG16 WP3 and ISO/IEC JTC1/SC29/WG11 7th Meeting: Geneva, CH, Nov. 24, 2011, Document No. JCTVC-G717-rl, pp. 1-9, (http://phenix.int-evry.fr/jct/doc_end_user/current_document.php!id=3978).
Tzu-Der Chuang, et al., "Non-CE9: Division-free MV scaling", Joint Collaborative Team on Video Coding (JCT-VC) of ITU-T SG16 WP3 and ISO/IEC JTC1/SC29/WG11, 7th Meeting: Geneva, CH, Nov. 30, 2011, Document No. JCTVC-G223, pp. 1-6.
Bross, et al. "WD5: Working Draft 5 of High-Efficiency Video Coding", Joint Collaborative Team on Video Coding of ITU-T SG16 WP3 and ISO/IEC JTC1/SC29/WG11, 7th Meeting, Nov. 21-Nov. 30, 2011, Document: JCTVC-G1103_d9, Geneva, Switzerland, 11 pages total, http://phenix.it-sudparis.eu/jct/doc_end_user/documents/7_Geneva/wg11/JCTVC-G1103-v12.zip.
Communication dated Apr. 28, 2016, issued by the Korean Intellectual Property Office in counterpart Korean Patent Application No. 10-2015-0156552.
Communication dated Jun. 7, 2016, issued by the Japanese Patent Office in counterpart Japanese Patent Application No. 2015-520054.

(56) References Cited

OTHER PUBLICATIONS

Communication dated Jun. 8, 2016, issued by the Federal Service for Intellectual Property in counterpart Russian Patent Application No. 2015103123.
Communication dated Sep. 23, 2016, issued by the Taiwanese Intellectual Property Office in counterpart Taiwanese Application No. 102123696, English Translation.
Communication dated Dec. 20, 2016, issued by the Taiwanese Intellectual Property Office in counterpart Taiwanese Patent Application No. 105134375.
Communication dated Jan. 22, 2018, issued by the Korean Patent Office in counterpart Korean application No. 10-2014-0148741.
Communication dated May 14, 2018, issued by the Korean Intellectual Property Office in counterpart Korean Patent Application No. 10-2015-0051967.
Communication dated May 23, 2018, issued by the Federal Service for Intellectual Property in counterpart Russian Patent Application No. 2017121558/08.
Communication dated Jun. 7, 2018, issued by the Korean Intellectual Property Office in counterpart Korean Patent Application No. 10-2014-0148741.
Communication dated Jul. 16, 2018, issued by the Korean Intellectual Property Office in counterpart Korean Patent Application No. 10-2014-0148741.
Communication dated Jun. 1, 2017 by the State Intellectual Property Office of P.R. China in counterpart Chinese Patent Application No. 201380035705.0.
Communication dated May 9, 2017 by the Indonesian Patent Office in counterpart Indonesian Patent Application No. P-00201500345.
Communication dated Jul. 17, 2017 by the European Patent Office in counterpart European Patent Application No. 13813804.5.

\* cited by examiner

FIG. 15
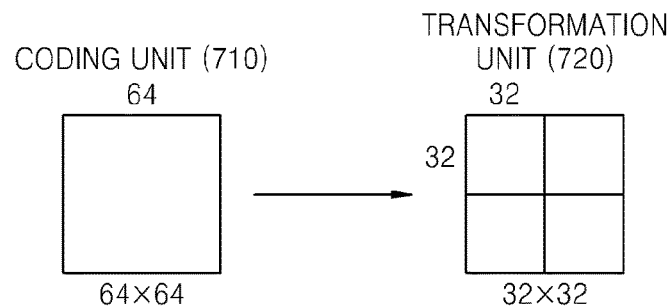
FIG. 16
PARTITION TYPE (800)
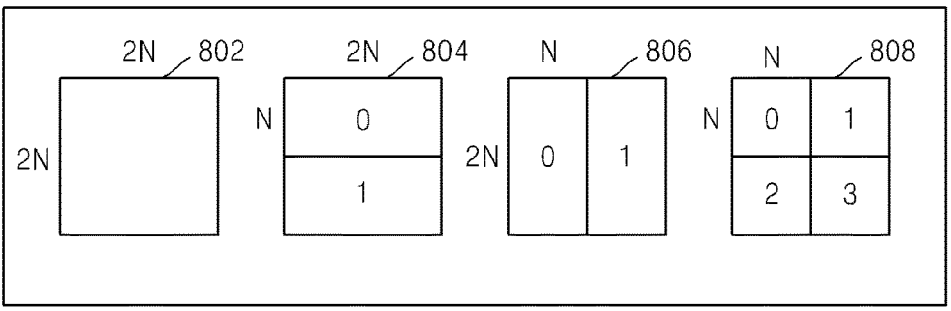
PREDICTION MODE (810)
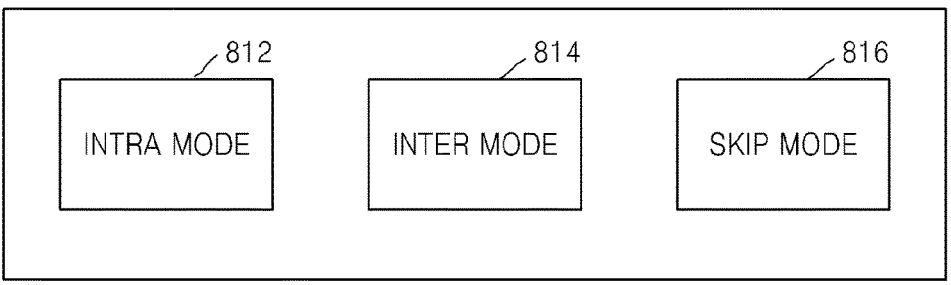
SIZE OF TRANSFORMATION UNIT (820)
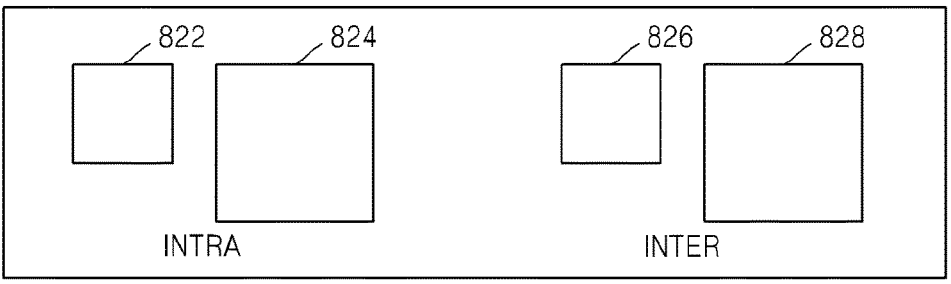

CODING UNIT (1010)

PREDICTION UNIT (1060)

MOTION VECTOR PREDICTION METHOD AND APPARATUS FOR ENCODING OR DECODING VIDEO

CROSS-REFERENCE TO RELATED APPLICATIONS

This application is a National Stage application under 35 U.S.C. § 371 of PCT/KR2013/005866, filed on Jul. 2, 2013, which claims the benefit of U.S. Provisional Application No. 61/667,133, filed on Jul. 2, 2012, all the disclosures of which are incorporated herein in their entireties by reference.

BACKGROUND

1. Field

Apparatuses and methods consistent with exemplary embodiments relate to encoding and decoding a video, and more particularly, to encoding and decoding a video by performing inter prediction and/or motion compensation.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

Image data in a spatial domain is converted into coefficients in a frequency domain by using frequency transformation. In a video codec, an image is split into blocks having a predetermined size and discrete cosine transform (DCT) is performed on each block to encode frequency coefficients in a block unit so as to quickly perform frequency transformation. The coefficients in the frequency domain are easily compressed compared to the image data in the spatial domain. In particular, since an image pixel value in the spatial domain is expressed in a prediction error via inter prediction or intra prediction of the video codec, a large amount of data may be converted to 0 when frequency transformation is performed on the prediction error. The video codec replaces data that continuously and repeatedly occurs by data having a small size, thereby reducing an amount of data.

SUMMARY

Aspects of one or more exemplary embodiments provide a method and apparatus for determining a motion vector via motion vector prediction, and provide a method and apparatus for encoding a video accompanied by inter prediction and motion compensation via motion vector prediction and a method and apparatus for decoding a video accompanied by motion compensation via motion vector prediction.

According to an aspect of an exemplary embodiment, there is provided a motion vector prediction method for inter prediction, the motion vector prediction method including: determining, from among neighboring blocks of a current block, a plurality of candidate blocks that are referred to so as to predict a motion vector of the current block; determining a candidate motion vector of a first candidate block among the determined plurality of candidate blocks, based on whether a reference image of the first candidate block and a reference image of the current block are long-term reference images; and determining the motion vector of the current block by using a candidate motion vector list including the determined candidate motion vector of the first candidate block and candidate motion vectors from remaining candidate blocks among the determined plurality of candidate blocks.

According to an aspect of another exemplary embodiment, there is provided a motion vector prediction apparatus for inter prediction, the motion vector prediction apparatus including: a candidate block determiner configured to determine, from neighboring blocks of a current block, a plurality of candidate blocks that are referred to so as to predict a motion vector of the current block, and determining a candidate motion vector of a first candidate block among the determined plurality of candidate blocks, based on whether a reference image of the first candidate block and a reference image of the current block are long-term reference images; and a motion vector determiner configured to determine the motion vector of the current block by using a candidate motion vector list including the determined candidate motion vector of the first candidate block and candidate motion vectors from remaining candidate blocks among the determined plurality of candidate blocks.

According to aspects of one or more exemplary embodiments, when at least one of a current block and reference images of the current block is a long-term reference image, an operation of adjusting a size of a motion vector of a candidate block or an operation of referring to the motion vector of the candidate block is omitted and the current block may be predicted by referring to a motion vector of another candidate block having relatively high prediction accuracy. Accordingly, efficiency of operations of predicting a motion vector may be improved.

DESCRIPTION OF THE DRAWINGS

FIG. 15 is a diagram for describing a relationship between a coding unit and transformation units, according to an exemplary embodiment;

FIG. 16 is a diagram for describing encoding information of coding units corresponding to a coded depth, according to an exemplary embodiment;

DETAILED DESCRIPTION OF EXEMPLARY EMBODIMENTS

Hereinafter, a motion vector prediction apparatus and a motion vector determining method according to one or more exemplary embodiments will be described with reference to FIGS. 1 through 4B. Also, video encoding and decoding methods and video encoding and decoding apparatuses accompanied by a motion vector prediction method, according to one or more exemplary embodiments, will be described with reference to FIGS. 5 and 8. Also, video encoding operations and video decoding operations accompanied by motion vector prediction operations and based on coding units having a tree structure, according to one or more exemplary embodiments, will be described with reference to FIGS. 9 through 21. Hereinafter, an 'image' may denote a still image or a moving image of a video, or a video itself.

A motion vector prediction apparatus and a motion vector determining method according to one or more exemplary embodiments will be described with reference to FIGS. 1 through 4B. Furthermore, video encoding and decoding methods and video encoding and decoding apparatuses, which are accompanied by a motion vector prediction method, according to one or more exemplary embodiments will be described with reference to FIGS. 5 and 8.

Figure 1:
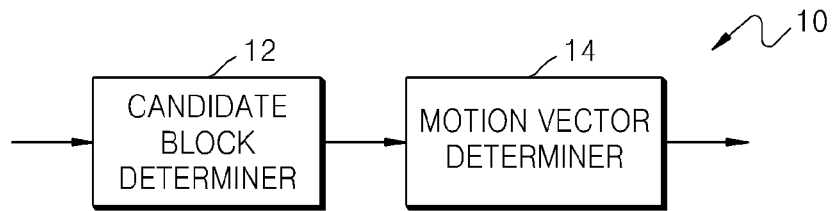
FIG. 1 is a block diagram of a motion vector prediction apparatus according to an exemplary embodiment.

FIG. 1 is a block diagram of a motion vector prediction apparatus 10 according to an exemplary embodiment.

The motion vector prediction apparatus 10 includes a candidate block determiner 12 and a motion vector determiner 14.

Inter prediction uses similarity between a current image and another image. A reference region similar to a current region of the current image is detected from a reference image restored prior to the current image. A distance between the current region and the reference region on coordinates is expressed in a motion vector, and a difference between pixel values of the current region and the reference region is expressed as residual data. Accordingly, instead of directly outputting image information of the current region, an index indicating the reference image, the motion vector, and the residual data may be output via inter prediction of the current region.

The motion vector prediction apparatus 10 according to an exemplary embodiment may perform inter prediction according to blocks of each image of a video. A block may have a square shape, a rectangular shape, or an arbitrary geometrical shape, and is not limited to a data unit having a predetermined size. The block according to an exemplary embodiment may be a maximum coding unit, a coding unit, a prediction unit, or a transformation unit, among coding units according to a tree structure. Video encoding and decoding operations based on coding units according to a tree structure will be described later with reference to FIGS. 9 through 21.

The reference image used for inter prediction of the current image must be decoded prior to the current image. The reference image for inter prediction according to an exemplary embodiment may be classified into a short-term reference image and a long-term reference image. A decoded picture buffer stores restored images generated via motion compensation of previous images. The generated restored images may be used as the reference images for inter prediction of other images. Accordingly, at least one short-term reference image or at least one long-term reference image for inter prediction of the current image may be selected from among the restored images stored in the decoded picture buffer. The short-term reference image may be an image decoded immediately or recently prior to the current image according to a decoding order, whereas the long-term reference image may be an image decoded long prior to the current image but is selected and stored in the decoded picture buffer to be used as the reference image for inter prediction of other images.

A motion vector of a current block may be determined by referring to a motion vector of another block for motion vector prediction, prediction unit (PU) merging, or advanced motion vector prediction (AMVP).

The motion vector prediction apparatus 10 may determine a motion vector of a current block by referring to a motion vector of another block spatially or temporally adjacent to the current block. The motion vector prediction apparatus 10 may determine a candidate motion vector list including a plurality of motion vectors of candidate blocks that may be referred to. The motion vector prediction apparatus 10 may determine the motion vector of the current block by referring to one motion vector selected from the candidate motion vector list.

The candidate block determiner 12 may determine a plurality of candidate blocks that may be referred to so as to predict the motion vector of the current block, from among neighboring blocks surrounding the current block.

A candidate block according to one or more exemplary embodiments may be a neighboring block adjacent to the current block in a current image of the current block, or a collocated block at a same location as the current block in an image restored prior to the current image.

The motion vector determiner 14 may generate the candidate motion vector list including candidate motion vectors of the plurality of candidate blocks being referred to so as to predict the motion vector of the current block.

The motion vector determiner 14 may determine a motion vector of a candidate block among the plurality of candidate blocks as a candidate motion vector to be one in the candidate motion vector list, based on whether a reference image of the candidate block and a reference image of the current block are each a long-term reference image. The motion vector determiner 14 may select a current motion vector of a candidate block as a candidate motion vector, or scale a current motion vector and then select the scaled current motion vector as a candidate motion vector. The determined candidate motion vector may be included in the candidate motion vector list.

When the reference image of the candidate block is different from the reference image of the current block, the motion vector determiner 14 may determine whether the reference image of the current block and the reference image of the candidate block are each a long-term reference image. The motion vector determiner 14 may determine how to use the motion vector of the candidate block based on whether the reference images of the current block and candidate block are each a short-term reference image or a long-term reference image.

When the reference image of the current block and the reference image of the candidate block are both long-term reference images, the motion vector determiner 14 may determine a current motion vector of the candidate block as a candidate motion vector. Here, the current motion vector of the candidate block is included in the candidate motion vector list without scaling.

When the reference image of the current block and the reference image of the candidate block are both short-term reference image, the motion vector determiner 14 may scale a current motion vector of the candidate block. Here, the candidate block determiner 12 may scale the current motion vector of the candidate block based on a ratio of a distance between the current image and the reference image of the current block and a distance between an image of the candidate block and the reference image of the candidate block. The motion vector determiner 14 may include the scaled current motion vector of the candidate block in the candidate motion vector list.

When one of the reference image of the current block and the reference image of the candidate block is a short-term reference image and the other one is a long-term reference image, the motion vector determiner 14 may determine not to use the motion vector of the candidate block as a candidate motion vector of the candidate motion vector list. Reference possibility information of the candidate block may be set to a disabled state.

Alternatively, when one of the reference image of the current block and the reference image of the candidate block is a short-term reference image and the other one is a long-term reference image, the candidate motion vector of the first candidate block may be set to 0.

The motion vector determiner 14 may determine at least one candidate motion vector from the candidate motion vector list, and determine the motion vector of the current block by using the selected at least one candidate motion vector. The motion vector determiner 14 may copy, combine, or modify the at least one candidate motion vector to determine the motion vector of the current block.

Figure 2:
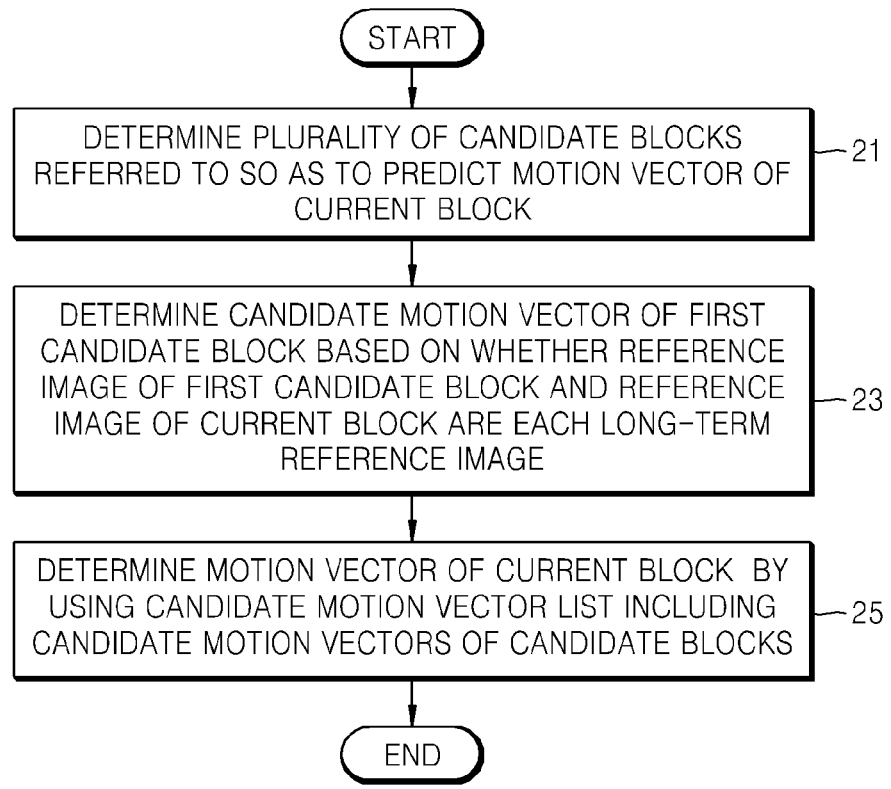
FIG. 2 is a flowchart illustrating a motion vector prediction method according to an exemplary embodiment.

FIG. 2 is a flowchart illustrating a motion vector prediction method according to an exemplary embodiment.

A motion vector of a current block may be predicted by using a motion vector of a block temporally or spatially adjacent to the current block by using the motion vector prediction apparatus 10 according to an exemplary embodiment. Alternatively, a plurality of candidate blocks capable of predicting a motion vector may be determined, one of the candidate blocks may be selected, and a motion vector of a current block may be determined by referring to a motion vector of the selected candidate block.

When a reference image indicated by a reference index of a predetermined candidate block from among candidate blocks is different from a reference image of a current block and the motion vector prediction apparatus 10 predicts a motion vector of the current block by referring to a motion vector of the predetermined candidate block, accuracy of the predicted motion vector may be low even when the motion vector of the predetermined candidate block is scaled. Accordingly, when the reference image of the current block and the reference image of the predetermined candidate block are different from each other, the motion vector prediction apparatus 10 may determine whether to scale and refer to the motion vector of the predetermined candidate block or whether not to refer to the corresponding motion vector.

The motion vector prediction method, wherein a motion vector of a current block is predicted from a motion vector of a candidate block by the motion vector prediction apparatus 10, will now be described with reference to operations 21, 23, and 25 of FIG. 2.

In operation 21, the motion vector prediction apparatus 10 may determine candidate blocks to be referred to, from neighboring blocks spatially adjacent to a current block or from blocks at the same location as the current block from among images temporally prior to or next to a current image.

In operation 23, the motion vector prediction apparatus 10 may determine a motion vector of a first candidate block as a candidate motion vector of the current block based on whether the reference image of the current block and a reference image of the first candidate block are each a long-term reference image.

In operation 25, the motion vector prediction apparatus 10 may determine a candidate motion vector list including the candidate motion vector of the first candidate block and candidate motion vectors from remaining candidate blocks. The motion vector prediction apparatus 10 may determine the motion vector of the current block by using at least one candidate motion vector in the candidate motion vector list.

When the reference image of the first candidate block is different from the reference image of the current block, the motion vector prediction apparatus 10 may determine whether to use the motion vector of the first candidate block as a candidate motion vector in the candidate motion vector list based on whether the reference image of the current block and the reference image of the first candidate block are each a short-term reference image or a long-term reference image.

The motion vector prediction apparatus 10 may determine whether the reference image of the current block is a long-term reference image by using a long-term reference index indicating whether the reference image of the current block is a long-term reference image. Similarly, it is determined whether the reference image of the first candidate block is a long-term reference image by using a long-term reference index of the first candidate block.

In operation 25, when the reference images of the current block and the first candidate block are both long-term reference images, the motion vector prediction apparatus 10 may include a current motion vector of the first candidate block in the candidate motion vector list without scaling the current motion vector of the first candidate block.

In operation 25, when one of the reference images is a short-term reference image and the other one is a long-term reference image, it may be determined that the motion vector of the first candidate block is not used in the candidate motion vector list.

In operation 25, when both of the reference images are short-term reference images, the current motion vector of the first candidate block may be scaled according to a ratio of a distance between the reference images of the current image and the current block and a distance between an image of the first candidate block and the reference image of the first candidate block. The scaled current motion vector may be included in the candidate motion vector list.

The motion vector prediction apparatus 10 may determine the candidate motion vector list via operations 21, 23, and 25. When only one of the reference images is a long-term reference image, the motion vector prediction apparatus 10 excludes the motion vector of the first candidate block from the candidate motion vector list, and thus is not referred to. Accordingly, the motion vector prediction apparatus 10 may determine the motion vector of the current block by referring to remaining motion vectors in the candidate motion vector list.

When both of the reference images are long-term reference images, the motion vector prediction apparatus 10 includes the motion vector of the first candidate block into the candidate motion vector list without scaling. Accordingly, the motion vector prediction apparatus 10 may select an optimum reference motion vector from among the motion vector of the first candidate block and the remaining candidate motion vector, and determine the motion vector of the current block based on the selected optimum reference motion vector.

When both of the reference images are short-term reference images, the motion vector prediction apparatus 10 scales the current motion vector of the first candidate block and includes the scaled current motion vector into the candidate motion vector list, as the candidate motion vector. Accordingly, the motion vector prediction apparatus 10 may select an optimum reference motion vector from among the candidate motion vector of the first candidate block and the remaining candidate motion vectors, and determine the motion vector of the current block by using the selected optimum reference motion vector.

As described above, according to the motion vector prediction apparatus 10 and the motion vector prediction method described above with reference to FIGS. 1 and 2, when at least one of the reference images is a long-term reference image, an operation of scaling a motion vector of a candidate block or an operation of referring to a motion vector of a candidate block may be omitted.

In other words, if a motion vector of a current block is predicted by referring to a motion vector of a candidate block when a reference image of the current block and a reference image of the candidate block are different from each other and at least one of the reference images is a long-term reference image, accuracy of the predicted motion vector may be low. Thus, an operation of referring to the motion vector of the candidate block whose prediction accuracy is low may be omitted, and the current block may be predicted by referring to a motion vector of another candidate block whose prediction accuracy is relatively high. Accordingly, efficiency of predicting a motion vector may be increased.

Figure 3:
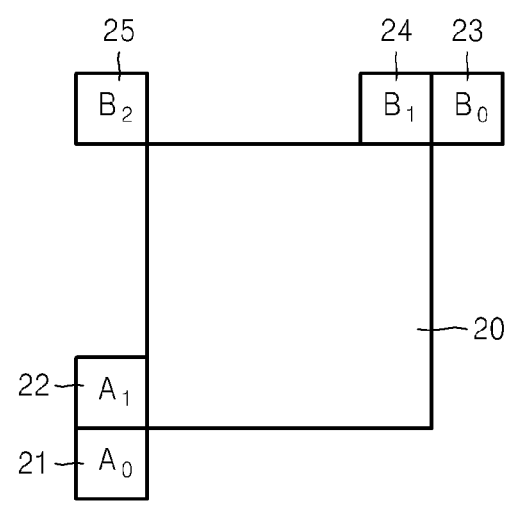
FIG. 3 illustrates neighboring blocks spatially adjacent to a current block, according to an exemplary embodiment.

FIG. 3 illustrates neighboring blocks spatially adjacent to a current block 20, according to an exemplary embodiment.

In order to predict encoding information of the current block 20, encoding information of at least one of a block $A_0$ 21, a block $A_1$ 22, a block $B_0$ 23, a block $B_1$ 24, and a block $B_2$ 25 from among neighboring blocks spatially adjacent to the current block 20 may be referred to. In FIG. 3, sizes of the block $A_0$ 21, the block $A_1$ 22, the block $B_0$ 23, the block $B_1$ 24, and the block $B_2$ 25 do not show actual sizes of neighboring blocks. Here, the block $A_0$ 21, the block $A_1$ 22, the block $B_0$ 23, the block $B_1$ 24, and the block $B_2$ 25 show blocks located in relative directions with respect to the current block 20.

An x-coordinate of a block increases from left to right and an y-coordinate of the block increases from top to bottom. The block $A_0$ 21 may be a block including a sample whose x- and y-coordinates are both smaller than a bottom left sample. The block $A_1$ 22 may be a block including samples whose x-coordinate is smaller than but y-coordinate is the same as the bottom left sample. The block $B_0$ 23 may be a block including a sample whose x- and y-coordinates are both larger than a top right sample. The $B_1$ 24 may be a block including a sample whose y-coordinate is smaller than but x-coordinate is the same as the top right sample. The block $B_2$ 25 may be a block including a sample whose x- and y-coordinates are both smaller than a top left sample.

The motion vector prediction apparatus 10 may use the block $A_0$ 21, the block $A_1$ 22, the block $B_0$ 23, the block $B_1$ 24, and the block $B_2$ 25 as candidate blocks in order to predict a motion vector of the current block 20. Accordingly, the motion vector prediction apparatus 10 may refer to encoding information of the block $A_0$ 21, the block $A_1$ 22, the block $B_0$ 23, the block $B_1$ 24, and the block $B_2$ 25 from among the neighboring blocks surrounding the current block 20.

The motion vector prediction apparatus 10 may determine a candidate block which is to be a reference block of the current block and whose prediction information is to be merged with prediction information of the current block 20 by using candidate motion vectors included in a candidate motion vector list. The prediction information of the determined candidate block may be encoded as prediction information of the current block.

For example, when encoding information of the block $A_0$ 21 from among the block $A_0$ 21, the block $A_1$ 22, the block $B_0$ 23, the block $B_1$ 24, and the block $B_2$ 25 is same as the encoding information of the current block 20, the current block 20 may be merged and encoded with the block $A_0$ 21. By merging the current block 20 and the block $A_0$ 21, an overlapping portion of the encoding information of the block $A_0$ 21 and the current block 20 is not repeatedly encoded. Accordingly, when an encoder outputs the encoding information of the block $A_0$ 21, the encoding information of the current block 20 may not be output again. Even when the encoding information of the current block 20 is not parsed while a receiver parses encoding information for blocks including the current block 20 and the block $A_0$ 21, which are mutually merged, a decoder may decode the current block 20 by using the encoding information parsed in advance for the block $A_0$ 21.

The motion vector prediction apparatus 10 may predict a motion vector of the current block 20 by combining at least one of candidate motion vectors in a candidate motion vector list.

While predicting a motion vector, the motion vector of the current block 20 may be determined by using the motion vectors of the block $A_0$ 21, the block $A_1$ 22, the block $B_0$ 23, the block $B_1$ 24, and the block $B_2$ 25 disposed adjacent to the current block 20. A motion vector estimator of the current block 20 may be determined by using motion vector estimators of the block $A_0$ 21, the block $A_1$ 22, the block $B_0$ 23, the block $B_1$ 24, and the block $B_2$ 25. Alternatively, the motion vector estimator of the current block 20 may be determined by using a combination of two or more motion vectors (motion vector estimators) of the block $A_0$ 21, the block $A_1$ 22, the block $B_0$ 23, the block $B_1$ 24, and the block $B_2$ 25.

Accordingly, the motion vector (motion vector estimator) of the current block 20 may be predicted from at least one of the motion vectors (motion vector estimators) of the block $A_0$ 21, the block $A_1$ 22, the block $B_0$ 23, the block $B_1$ 24, and the block $B_2$ 25. Accordingly, when an encoder first encodes and outputs the motion vectors (motion vector estimators) of the block $A_0$ 21, the block $A_1$ 22, the block $B_0$ 23, the block $B_1$ 24, and the block $B_2$ 25, the encoder may not encode the motion vector (motion vector estimator) of the current block 20. Even when the motion vector (motion vector estimator) of the current block 20 is not received, a decoder may predict the motion vector (motion vector estimator) of the current block 20 by using at least one of the motion vectors (motion vector predictors) of the block $A_0$ 21, the block $A_1$ 22, the block $B_0$ 23, the block $B_1$ 24, and the block $B_2$ 25.

Hereinafter, a motion vector prediction scheme according to a type of a candidate block will be described with reference to FIGS. 4A and 4B.

Figure 4A:
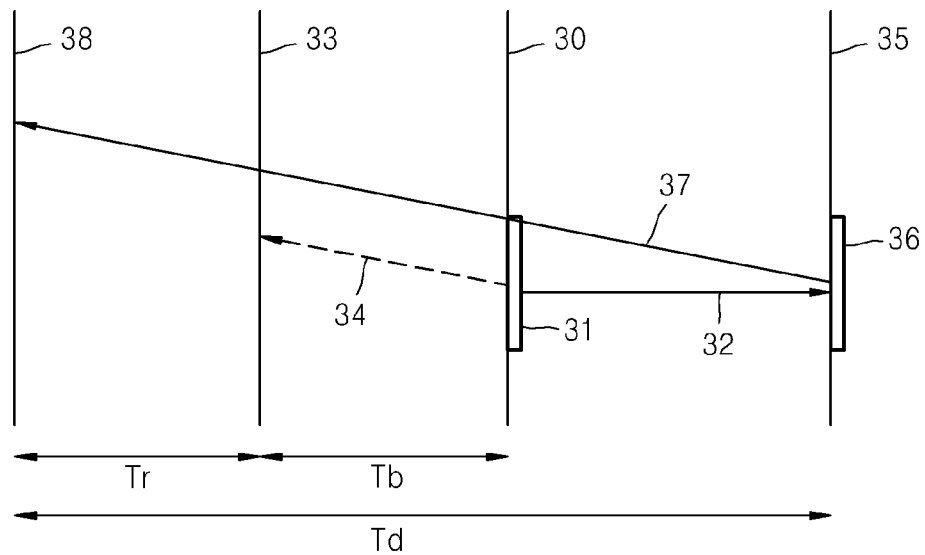
FIG. 4A is a diagram for describing a case when a candidate block is a collocated block of another image, according to an exemplary embodiment.

FIG. 4A is a diagram for describing a case when a candidate block is a collocated block 36 of another image, according to an exemplary embodiment.

A collocated image 35 is an image restored prior to a current image 30, and may be referred to for inter prediction of a current block 31 in the current image 30. The collocated image 35 may be determined according to a collocated index 32 of the current block 31.

A block of the collocated image 35, which is at a same location as the current block 31 of the current image 30, may be determined as the collocated block 36. The motion vector prediction apparatus 10 may use the collocated block 36 as a candidate block to be referred to so as to predict a motion vector 34 of the current block 31. Accordingly, the motion vector 34 of the current block 31 may be predicted by referring to a motion vector 37 of the collocated block 36.

A collocated reference image 38 may be determined according to picture order count (POC) indicated by a reference index of the collocated block 36. A current reference image 33 may be determined according to POC indicated by a reference index of the current block 31.

However, when the collocated reference image 38 and current reference image 33 are different from each other, the motion vector prediction apparatus 10 may determine again whether to refer to the motion vector 37 of the collocated block 36 or how to refer to the motion vector 37 of the collocated block 36.

In detail, when the reference index of the collocated block 36 and the reference index of the current block 31 are different from each other, the motion vector prediction apparatus 10 may determine whether the collocated reference image 38 and the current reference image 33 are each a short-term or long-term reference image by using long-term reference indexes of the collocated block 36 and current block 31.

However, when the collocated reference image 38 and the current reference image 33 are different from each other, the motion vector prediction apparatus 10 may again determine whether to refer to the motion vector 37 of the collocated block 36 or how to refer to the motion vector 37 of the collocated block 36.

When the current reference image 33 and the collocated reference image 38 are different from each other but are both short-term reference images, the motion vector 37 of the collocated block 36 may be scaled based on a ratio of a distance Td between the collocated image 35 and the collocated reference image 38 and a distance Tb between the current image 30 and the current reference image 33. Here, the distance Td between the current image 30 and the collocated reference image 38 may be determined based on a difference value of POCs of the current image 30 and collocated reference image 38. Similarly, the distance Tb between the current image 30 and current reference image 33 may be determined based on a difference value of POCs of the current image 30 and current reference image 33.

In other words, when the current reference image 33 and the collocated reference image 38 are both short-term reference images, a candidate motion vector MVcol' may be updated to a value obtained by multiplying the motion vector 37 MVcol of the collocated block 36 by the ratio of the distance Td and the distance Tb. (MVcol'=MVcol*Tb/Td)

Accordingly, when the current reference image 33 and the collocated reference image 38 are different from each other but are both short-term reference images, the motion vector prediction apparatus 10 may change the motion vector 37 of the collocated block 36 in a candidate motion vector list to the candidate motion vector MVcol'.

When one of the current reference image 33 and the collocated reference image 38 is a short-term reference image and the other one is a long-term reference image, a not-available flag may be assigned to the motion vector 37 of the collocated block 36. In this case, the motion vector 37 of the collocated block 36 may be excluded from the candidate motion vector list of the current image 30.

When the current reference image 33 and the collocated reference image 38 are both long-term reference images, the motion vector 37 of the collocated block 36 may be maintained. In this case, the motion vector 37 of the collocated block 36 may be maintained without scaling in the candidate motion vector list.

Figure 4B:
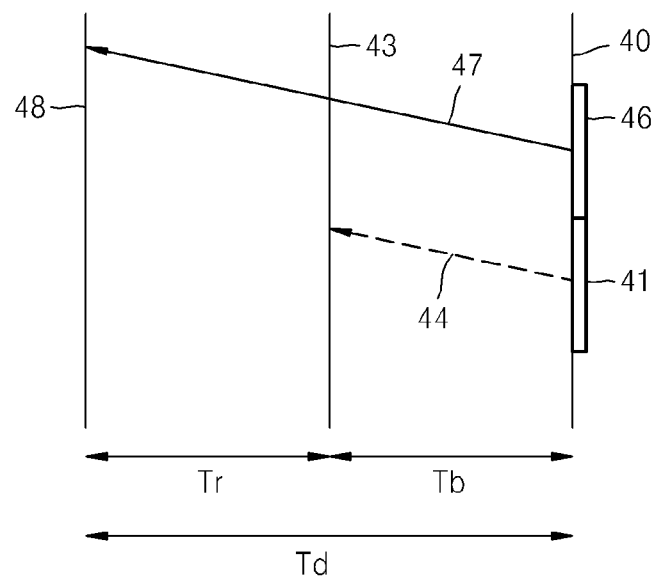
FIG. 4B is a diagram for describing a case when a candidate block is a neighboring block of a same image, according to an exemplary embodiment.

FIG. 4B is a diagram for describing a case when a candidate block is a neighboring block 46 of a same image, according to an exemplary embodiment.

The motion vector prediction apparatus 10 may use the neighboring block 46 adjacent to a current block 41 in a current image 40, as a candidate block to be referred to so as to predict a motion vector 44 of the current block 41. Accordingly, the motion vector 44 of the current block 41 may be predicted by referring to a motion vector 47 of the neighboring block 46.

A neighboring reference image 48 may be determined according to POC indicated by a reference index of the neighboring block 46. A current reference image 43 may be determined according to POC indicated by a reference index of a current block 41.

However, when the neighboring reference image 48 and the current reference image 43 are different from each other, the motion vector prediction apparatus 10 may again determine whether the motion vector 47 of the neighboring block 46 is referred to, or how to refer to the motion vector 47 of the neighboring block 46.

In detail, when the reference index of the neighboring block 46 and the reference index of the current block 41 are different from each other, the motion vector prediction apparatus 10 may determine whether the neighboring block 46 and the current reference image 43 are each a short-term or long-term reference image by using a long-term reference index of the neighboring block 46 and a long-term reference index of the current block 41.

However, when the neighboring block 46 and the current reference image 33 are different from each other, the motion vector prediction apparatus 10 may determine whether to refer to the motion vector 47 of the neighboring block 46 or how to refer to the motion vector 47 of the neighboring block 46.

When the current reference image 43 and the neighboring reference image 48 are different from each other but are both short-term reference images, the motion vector 47 of the neighboring block 46 may be scaled based on a ratio of a distance Td between the current image 40 and the neighboring reference image 48 and a distance Tb between the current image 40 and the current reference image 43. Here, the distance Td between the current image 40 and the neighboring reference image 48 may be determined based on a difference value of POCs of the current image 40 and neighboring reference image 48. Similarly, the distance Tb between the current image 40 and current reference image 43 may be determined based on a difference value of POCs of the current image 40 and current reference image 43.

In other words, when the current reference image 43 and the neighboring reference image 48 are both short-term reference images, a candidate motion vector MVne' may be updated to a value obtained by multiplying the ratio of the distance Td and the distance Tb by the motion vector 47 MVne of the collocated block 46. (MVne'=MVne*Tb/Td)

Accordingly, when the current reference image 43 and the neighboring reference image 48 are different from each other but are both short-term reference images, the motion vector prediction apparatus 10 may change the motion vector 47 of the neighboring block 46 in a candidate motion vector list to the candidate motion vector MVne'.

When one of the current reference image 43 and the neighboring reference image 48 is a short-term reference image and the other one is a long-term reference image, a not-available flag may be assigned to the motion vector 47 of the neighboring block 46. In this case, the motion vector 47 of the neighboring block 46 may be excluded from the candidate motion vector list of the current image 40.

When the current reference image 43 and the neighboring reference image 48 are both long-term reference images, the motion vector 47 of the neighboring block 46 may be maintained. In this case, the motion vector 47 of the neighboring block 46 may be maintained without scaling in the candidate motion vector list.

In FIGS. 4A and 4B, the motion vector prediction apparatus 10 may determine whether the current reference image 33 or 43 and a reference image (the collocated reference image 38 or neighboring reference image 48) of a candidate block (the collocated block 36 or neighboring block 46) are each a short-term or long-term reference image by using the long-term reference indexes of the current block 31 or 41 and the collocated block 36 or neighboring block 46, and determine whether to refer to the motion vector 37 or 47 of the collocated block 36 or neighboring block 46 or whether to refer to the motion vector 37 or 47 of the collocated block 36 or neighboring block 46 after scaling.

A video encoding method and a video decoding method, which are accompanied by a motion vector prediction method according to an exemplary embodiment, will now be described with reference to FIGS. 5 and 6.

Figure 5:
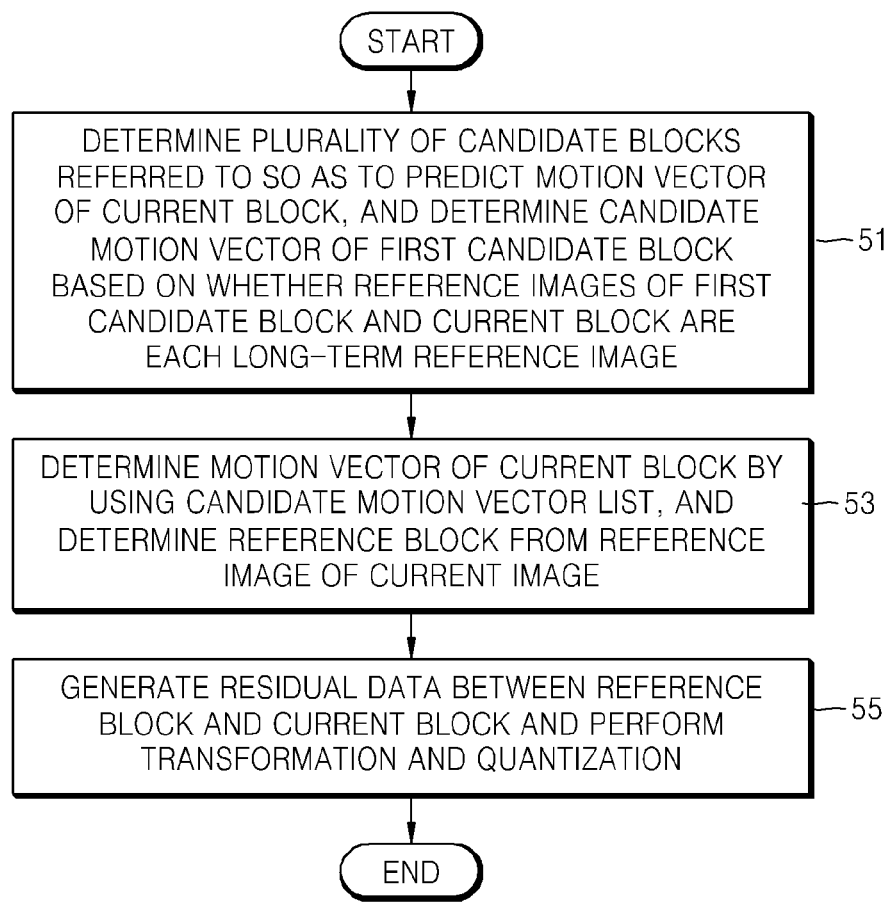
FIG. 5 is a flowchart illustrating a video encoding method accompanied by a motion vector prediction method, according to an exemplary embodiment.

FIG. 5 is a flowchart illustrating a video encoding method accompanied by a motion vector prediction method, according to an exemplary embodiment.

In operation 51, a plurality of candidate blocks may be determined from neighboring blocks of a current block, and motion vectors of the candidate blocks may be determined as one or more candidate motion vectors of the current block based on whether reference images of the current block and candidate blocks are each a long-term reference image, according to the motion vector prediction method.

When a reference image of a first candidate block in the candidate blocks is different from a reference image of the current block, it is determined whether to use a motion vector of the first candidate block as it is or after scaling, based on whether the reference images of the current block and first candidate block are each a long-term reference image.

When the reference images of the current block and first candidate block are both long-term reference images, the motion vector of the first candidate block may be included into a candidate motion vector list without scaling.

When one of the reference images is a short-term reference image and the other one is a long-term reference image, it may be determined not to use the motion vector of the first candidate block in the candidate motion vector list.

When the reference images are both short-term reference images, the motion vector of the first candidate block may be included into the candidate motion vector list after scaling.

In operation 53, a candidate motion vector list including the candidate motion vectors of the candidate blocks may be determined, and the motion vector of the current block may be determined by using at least one candidate motion vector in the candidate motion vector list.

One candidate motion vector in the candidate motion vector list may be selected as a reference motion vector. The selected candidate motion vector may be modified prior to being determined as the reference motion vector. Alternatively, at least one candidate motion vector may be selected and combined to be determined as the motion vector of the current block. For example, when there is different information of a motion vector, the difference information is synthesized to the reference motion vector so as to determine the motion vector of the current block.

When a reference block indicated by the determined motion vector of the current block is determined in a reference image of the current block, residual data between the reference block and the current block may be generated.

In operation 55, the residual data is transformed and quantized to generate quantized transformation coefficients.

Operations 51 through 55 may be performed according to blocks of the current image, thereby generating quantized transformation coefficients according to the blocks. Also, entropy encoding may be performed on the quantized transformation coefficients according to blocks so as to generate and output a bitstream.

The video encoding method of FIG. 5 may be realized by a video encoding apparatus. Video encoding operations including inter prediction, transformation, and quantization may be performed as a video encoding processor executing the video encoding method of FIG. 5 is operated by being mounted in the video encoding apparatus or being externally cooperated with the video encoding apparatus. The video encoding processor of the video encoding apparatus may perform basic video encoding processes as not only an individual processor, but also the video encoding apparatus, a central processing apparatus, or a graphic processing apparatus include a video encoding processing module.

Figure 6:
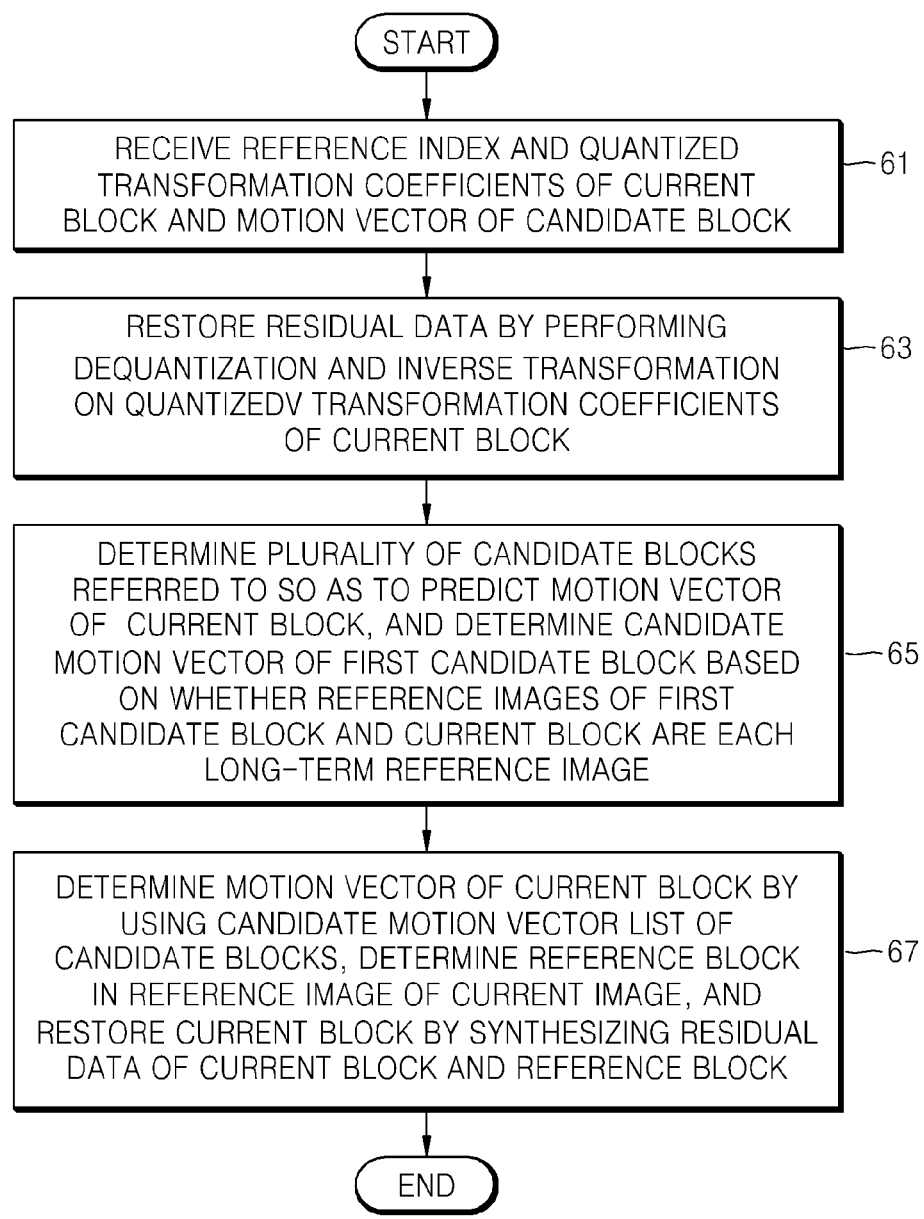
FIG. 6 is a flowchart illustrating a video decoding method accompanied by a motion vector prediction method, according to an exemplary embodiment.

FIG. 6 is a flowchart illustrating a video decoding method accompanied by a motion vector prediction method, according to an exemplary embodiment.

In operation 61, a reference index and quantized transformation coefficients of a current block, and a motion vector of a candidate block may be received.

In operation 63, dequantization and inverse transformation are performed on the quantized transformation coefficients of the current block received in operation 61 to restore residual data of the current block.

In operation 65, candidate blocks to be referred to so as to predict a motion vector of the current block may be determined. A candidate motion vector of a first candidate block in the candidate blocks may be determined based on whether a reference image of the first candidate block and a reference image of the current block are each a long-term reference image.

When the reference image of the current block and the reference image of the candidate block are both long-term reference images, the motion vector of the candidate block may be referred to without scaling.

When one of the reference images is a short-term reference image and the other one is a long-term reference image, the motion vector of the first candidate block may be determined not to be referred to.

When the reference images are both short-term reference images, the motion vector of the candidate block may be scaled and then referred to.

In operation 67, a candidate motion vector list including the candidate motion vectors determined in operation 65 may be generated. A reference motion vector may be determined by using at least one candidate motion vector in the candidate motion vector list. One candidate motion vector may be selected and used as it is, or may be modified before being used as the reference motion vector. Alternatively, at least one candidate motion vector may be combined to be used as the reference motion vector.

A reference block indicated by the motion vector of the current block may be determined in a reference image of the current block indicated by the received reference index of the current block. The current block may be restored by synthesizing the residual data and the determined reference block.

A current image including the restored current blocks may be restored by performing operations 61 through 67 according to blocks. When images are restored as such, a video including a sequence of restored images may be restored.

Operations 61 through 67 may be performed when a video is restored by decoding an encoded bitstream upon receiving the encoded bitstream during video decoding operations. Here, in operation 61, the received encoded bitstream may be parsed and the reference index and the quantized transformation coefficients of the current block and the motion vector of the candidate block may be extracted from the parsed bitstream.

During the video encoding method described above with reference to FIG. 5, operations 61 through 67 may also be performed in order to generate a restored image to be referred to for inter prediction of another image. Here, in operation 61, a reference index and quantized transformation coefficients of a current block generated via inter prediction, transformation, and quantization, and a motion vector of a candidate block are received, and then operations 63 through 67 are performed in order to use a finally restored current image as a reference image for inter prediction of another image.

The video decoding method of FIG. 6 may be realized by a video decoding apparatus. Video decoding operations including dequantization, inverse transformation, and prediction/compensation may be performed as a video decoding processor executing the video decoding method of FIG. 6 is operated by being mounted in the video decoding apparatus or being externally cooperated with the video decoding apparatus. The video decoding processor of the video decoding apparatus may perform basic video decoding processes as not only an individual processor, but also the video decoding apparatus, a central processing apparatus, or a graphic operation apparatus include a video decoding processing module.

A video encoder 70 and a video decoder 80 including the motion vector prediction apparatus 10 according to an exemplary embodiment will now be described with reference to FIGS. 7 and 8.

Figure 7:
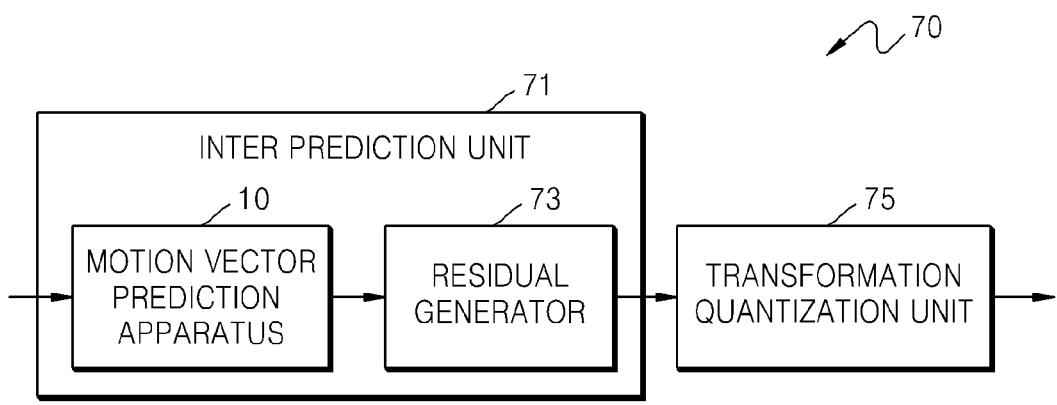
FIG. 7 is a block diagram of a video encoder including a motion vector prediction apparatus, according to an exemplary embodiment.

FIG. 7 is a block diagram of the video encoder 70 including the motion vector prediction apparatus 10, according to an exemplary embodiment.

The video encoder 70 may include an inter prediction unit 71 and a transformation quantization unit 75. The inter prediction unit 71 may include the motion vector prediction apparatus 10 according to an exemplary embodiment, and a residual generator 73.

The motion vector prediction apparatus 10 determines a motion vector according to blocks. Also, for motion vector prediction, prediction units (PUs) merging, or Advanced Motion Vector Prediction (AMVP), a motion vector of a current block may be predicted by referring to a motion vector of another block. The motion vector prediction apparatus 10 may determine a candidate motion vector list of the current block for motion vector prediction. One reference motion vector may be determined from candidate motion vectors included in the candidate motion vector list.

The motion vector prediction apparatus 10 may determine how to refer to a motion vector of a first candidate block among the candidate blocks in the candidate motion vector list based on whether a reference image of the first candidate block and a reference image of the current block are each a long-term reference image.

The motion vector prediction apparatus 10 may determine a reference motion vector by selecting an optimum candidate motion vector from the candidate motion vectors in the candidate motion vector list, and predict the motion vector of the current block by using the reference motion vector.

The residual generator 73 may determine a reference block indicated by the motion vector of the current block from the reference image of the current block, and generate residual data between the reference block and the current block.

Accordingly, the inter prediction unit 71 may output residual data according to blocks by performing inter prediction according to blocks.

The transformation quantization unit 75 may generate quantization transformation coefficients by performing transformation and quantization on the residual data output by the inter prediction unit 71. The transformation quantization unit 75 may generate quantized transformation coefficients according to blocks by performing transformation and quantization on residual data according to blocks received from the inter prediction unit 71.

The video encoder 70 may output an encoded bitstream by performing entropy encoding on the quantized transformation coefficients generated by the transformation quantization unit 75. Also, when a reference index, a motion vector, and a long-term reference index are output from the inter prediction unit 71, the video encoder 70 may output a bitstream by performing entropy encoding not only on the quantized transformation coefficients, but also on the reference index, the motion vector, and the long-term reference index.

Figure 8:
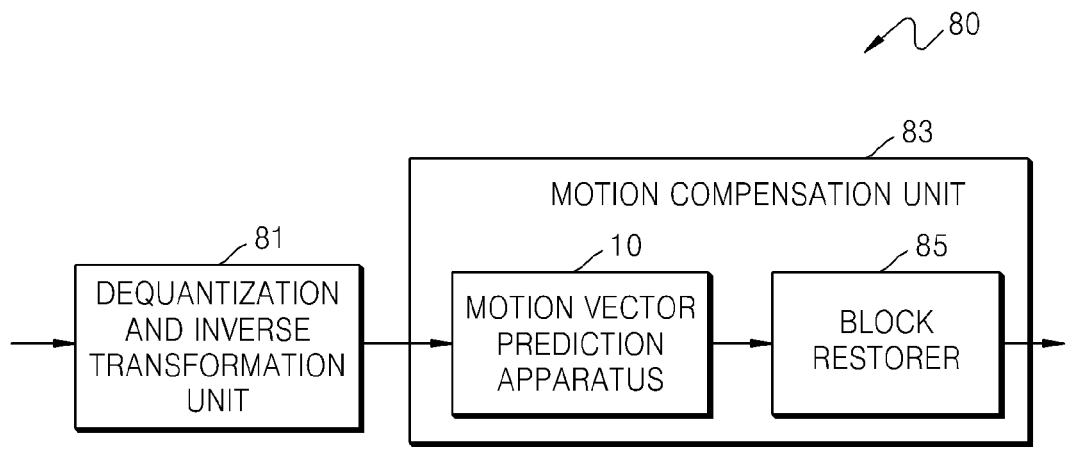
FIG. 8 is a block diagram of a video decoder including a motion vector prediction apparatus, according to an exemplary embodiment.

FIG. 8 is a block diagram of the video decoder 80 including the motion vector prediction apparatus 10, according to an exemplary embodiment.

The video decoder 80 includes a dequantization and inverse transformation unit 81 and a motion compensation unit 83. The inter prediction unit 71 may include the motion vector prediction apparatus 10 according to an exemplary embodiment and a block restorer 85.

The video decoder 80 may receive a reference index and quantized transformation coefficients of a current block, and a motion vector of a candidate block. The dequantization and inverse transformation unit 81 may restore residual data of the current block by performing dequantization and inverse transformation on the received quantized transformation coefficients of the current block.

The motion compensation unit 83 may restore the current block by performing motion compensation on the current block encoded via inter prediction.

The motion vector prediction apparatus 10 determines a motion vector according to blocks. The motion vector prediction apparatus 10 may determine a candidate motion vector list of the current block for motion vector prediction. A candidate block may be a collocated block or a neighboring block. The motion vector prediction apparatus 10 may determine one reference motion vector from candidate motion vectors included in the candidate motion vector list.

The motion vector prediction apparatus 10 may determine how to refer to a motion vector of a first candidate block in the candidate blocks based on whether a reference image of the first candidate block and a reference image of the current block are each a long-term reference image.

The motion vector prediction apparatus 10 may determine a reference motion vector by selecting an optimum candidate motion vector from the candidate motion vectors in the candidate motion vector list, and predict and determine the motion vector of the current block by using the reference motion vector.

The block restorer 85 may determine the reference image of the current block indicated by the reference index of the current block received by the video decoder 80. The motion vector of the current block determined by the motion vector prediction apparatus 10 indicates the reference block in the reference image, and the current block may be restored by synthesizing the reference block and the residual data of the current block.

Accordingly, the motion compensation unit 83 may restore blocks by performing motion compensation according to blocks, and restore a current image including the restored blocks. Accordingly, the video decoder 80 may restore a video including an image sequence as images are restored.

The video decoder 80 may further include an in-loop filtering unit that performs deblocking filtering on a restored current block and a restored image including restored blocks.

The video decoder 80 may restore a video by decoding an encoded bitstream upon receiving the encoded bitstream. Here, the video decoder 80 may parse the received bitstream and extract the reference index and the quantized transformation coefficients of the current block and the motion vector of the candidate block from the parsed bitstream. Also, the video decoder 80 may further include a receiver that receives a bitstream, performs entropy decoding on the bitstream, and parsing and extracting the reference index and quantized transformation coefficients of the current block, and the motion vector of the candidate block from the bitstream.

Also, the video decoder 80 may be combined to the video encoder 70 in order for the video encoder 70 of FIG. 7 to generate a restored image to be referred to for inter prediction of another image. Here, the video decoder 80 may receive the reference index and the quantized transformation coefficients of the current block generated and output via inter prediction, transformation, and quantization by the video encoder 70, and the motion vector of the candidate block, and output a finally restored current image through the dequantization and inverse transformation unit 81 and motion compensation unit 83. The restored image output by the video decoder 80 may be used as a reference image for inter prediction of another image by the video encoder 70.

As described above, the motion vector prediction apparatus 10 may spilt blocks of video data into coding units having a tree structure, and prediction units for inter prediction of coding units may be used. Hereinafter, a video encoding method, a video encoding apparatus, a video decoding method, and a video decoding apparatus based on coding units having a tree structure and transformation units will be described with reference to FIGS. 9 through 22.

Figure 9:
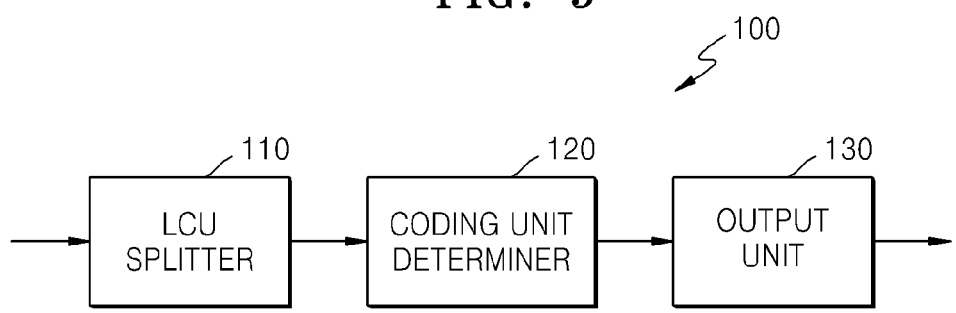
FIG. 9 is a block diagram of a video encoding apparatus based on coding units according to a tree structure, according to an exemplary embodiment.

FIG. 9 is a block diagram of a video encoding apparatus 100 based on coding units according to a tree structure, according to an exemplary embodiment.

The video encoding apparatus 100 based on coding units according to a tree structure involving video prediction based on coding units according to a tree structure includes a maximum coding unit splitter 110, a coding unit determiner 120, and an output unit 130. For convenience of explanation, "video encoding apparatus 100 based on coding units according to a tree structure" is referred to as "video encoding apparatus 100" hereinafter.

The maximum coding unit splitter 110 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to one or more exemplary embodiments include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit/partition, and a transformation unit, according to an exemplary embodiment, will be described in detail below with reference to FIGS. 11 through 22.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit according to an exemplary embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information, which are described above with reference to FIGS. 1 through 8.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a related art macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 100 of FIG. 9 may perform operations of the motion vector prediction apparatus 10 of FIG. 1 or the video encoder 70 of FIG. 7.

The coding unit determiner 120 may determine a prediction unit including a partition for inter prediction according to coding units having a tree structure for each maximum coding unit, and perform inter prediction unit.

The coding unit determiner 120 determines a motion vector according to prediction units. Also, for motion vector prediction, PU merging, or AMVP, a motion vector of a current prediction unit (partition) may be predicted by referring to a motion vector of another prediction unit. The motion vector prediction apparatus 10 may determine a candidate motion vector list of the current prediction unit for motion vector prediction. One reference motion vector may be determined from candidate motion vectors in the candidate motion vector list. A candidate prediction unit may be a neighboring prediction unit adjacent to the current prediction unit or a collocated prediction unit in a collocated image.

The coding unit determiner 120 may determine how to refer to a motion vector of a first candidate prediction unit from among a plurality of candidate prediction units adjacent to the current prediction unit, based on whether a reference image of the first candidate prediction unit and a reference image of the current prediction unit are each a long-term reference image.

It is determined whether the reference images are each a short-term or a long-term reference image based on long-term reference indexes of the current prediction unit and the first candidate prediction unit.

When the reference images are both long-term reference images, the motion vector of the candidate prediction unit may be referred to as it is without scaling.

When one of the reference images is a short-term reference image and the other one is a long-term reference image, it may be determined not to refer to the motion vector of the first candidate prediction unit.

When the reference images are both short-term reference images, the motion vector of the candidate prediction unit may be referred to after scaling.

The coding unit determiner 120 may determine a reference motion vector by selecting an optimum candidate motion vector from candidate motion vectors determined according to candidate blocks, and then predict and determine the motion vector of the current prediction unit by using the reference motion vector.

The coding unit determiner 120 may determine a reference block indicated by the motion vector of the current block in the reference image of the current prediction unit, and generate residual data between a reference prediction unit and the current prediction unit.

Accordingly, the coding unit determiner 120 may output residual data according to prediction units by performing inter prediction according to prediction units.

The coding unit determiner 120 may generate quantized transformation coefficients by performing transformation and quantization on transformation units of a coding unit including the residual data according to prediction units. Accordingly, the coding unit determiner 120 may generate quantized transformation coefficients according to transformation units.

The coding unit determiner 120 may perform operations of the video decoder 80 described above with reference to FIG. 8 in order to generate a reference image for inter prediction of a prediction unit.

The coding unit determiner 120 may restore the residual data of the current block by performing dequantization and inverse transformation on the received quantized transformation coefficients of the current prediction unit. The current prediction unit may be restored by performing motion compensation on the current prediction unit encoded via inter prediction.

As described above, the coding unit determiner 120 may determine how to use the motion vector of the first candidate prediction unit from among the plurality of candidate prediction units adjacent to the current prediction unit, based on whether the reference image of the first candidate prediction unit and the reference image of the current prediction unit are each a long-term reference image.

The coding unit determiner 120 may determine a reference motion vector by selecting an optimum candidate motion vector from among the candidate motion vectors included in the candidate motion vector list, and predict and determine the motion vector of the current prediction unit by using the reference motion vector.

The coding unit determiner 120 may determine the reference image of the current prediction unit indicated by the received reference index of the current prediction unit. The reference image of the current prediction unit may be determined according to POC indicated by the reference index of the current prediction unit. A reference index indicates POC regardless of whether a reference image is a long-term or short-term reference image, and an image indicated by the POC may be determined as the reference image.

A reference prediction unit indicated by the motion vector of the current prediction unit is determined from the reference image, and the current prediction unit may be restored by synthesizing the reference prediction unit and residual data of the current prediction unit.

Accordingly, the coding unit determiner 120 may restore prediction units by performing motion compensation according to prediction units, and restore a current image including the restored prediction units. The restored prediction units and the restored current image may be referred to as another prediction image and another image.

Figure 10:
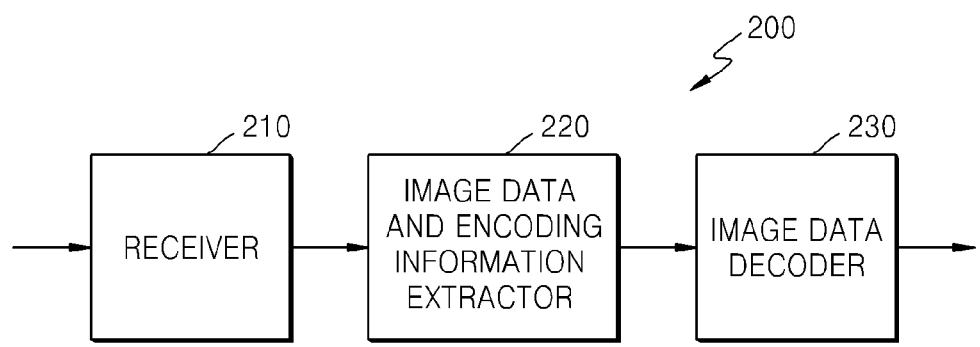
FIG. 10 is a block diagram of a video decoding apparatus based on coding units according to a tree structure, according to an exemplary embodiment.

FIG. 10 is a block diagram of a video decoding apparatus 200 based on coding units according to a tree structure, according to an exemplary embodiment.

The video decoding apparatus 200 based on coding units according to a tree structure involves video prediction based on coding units having a tree structure includes a receiver 210, an image data and encoding information extractor 220, and an image data decoder 230. For convenience of explanation, "video decoding apparatus 200 based on coding units according to a tree structure" is referred to as "video decoding apparatus 200" hereinafter.

Definitions of various terms, such as a coding unit, a depth, a prediction unit, a transformation unit, and information about various encoding modes, for decoding operations of the video decoding apparatus 200 are identical to those described with reference to FIG. 9 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. Decoding operations may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be restored.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Also, the image data decoder 230 of the video decoding apparatus 200 of FIG. 10 may perform operations of the motion compensation apparatus 10 of FIG. 1 or the video decoder 80 of FIG. 8.

The image data decoder 230 may determine the prediction unit for motion compensation and perform motion compensation for each prediction unit, according to coding units having a tree structure, for each maximum coding unit.

The image data decoder 230 may restore residual data of the current block by performing dequantization and inverse transformation on quantized transformation coefficients of a current prediction unit. The current prediction unit may be restored by performing motion compensation on the current prediction unit encoded via inter prediction.

The image data decoder 230 may determine whether a motion vector of a first candidate prediction unit from among a plurality of candidate prediction units adjacent to the current prediction unit is to be used as it is or after being modified based on whether a reference image of the first candidate prediction unit and a reference image of the current prediction unit are each a long-term reference image.

A candidate prediction unit may be a neighboring prediction unit adjacent to a current prediction unit in a current image or a collocated prediction unit in a collocated image.

It may be determined whether the reference images of the current prediction unit and first candidate prediction unit are each a short-term or long-term reference image based on long-term reference indexes of the current prediction unit and first candidate prediction unit.

When the reference images are both long-term reference images, the motion vector of the first candidate prediction unit may be used as it is without scaling.

When one of the reference images is a short-term reference image and the other one is a long-term reference image, it may be determined not to refer to the motion vector of the first candidate prediction unit.

When the reference images are both short-term reference images, the motion vector of the first candidate prediction unit may be scaled to be determined as a candidate motion vector.

The image data decoder 230 may determine a candidate motion vector list including candidate motion vectors determined according to candidate blocks. A reference motion vector is determined by selecting an optimum candidate motion vector from the candidate motion vector list, and the motion vector of the current block may be predicted and determined by using the reference motion vector.

The image data decoder 230 may determine the reference image of the current prediction unit according to POC indicated by a reference index of the current prediction unit. A reference index indicates POC regardless of whether a reference image is a long-term or short-term reference image, and an image indicated by the POC may be determined as the reference image.

A reference prediction unit indicated by the motion vector of the current prediction unit is determined from the reference image, and the current prediction unit may be restored by synthesizing the reference prediction unit and the residual data of the current prediction unit.

Accordingly, the image data decoder 230 may restore prediction units by performing motion compensation according to prediction units, and restore a current image including the restored prediction unit. Accordingly, a video including an image sequence may be restored as images are restored. The restored prediction unit and the restored current image may be referred to for another prediction unit and an image.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 11:
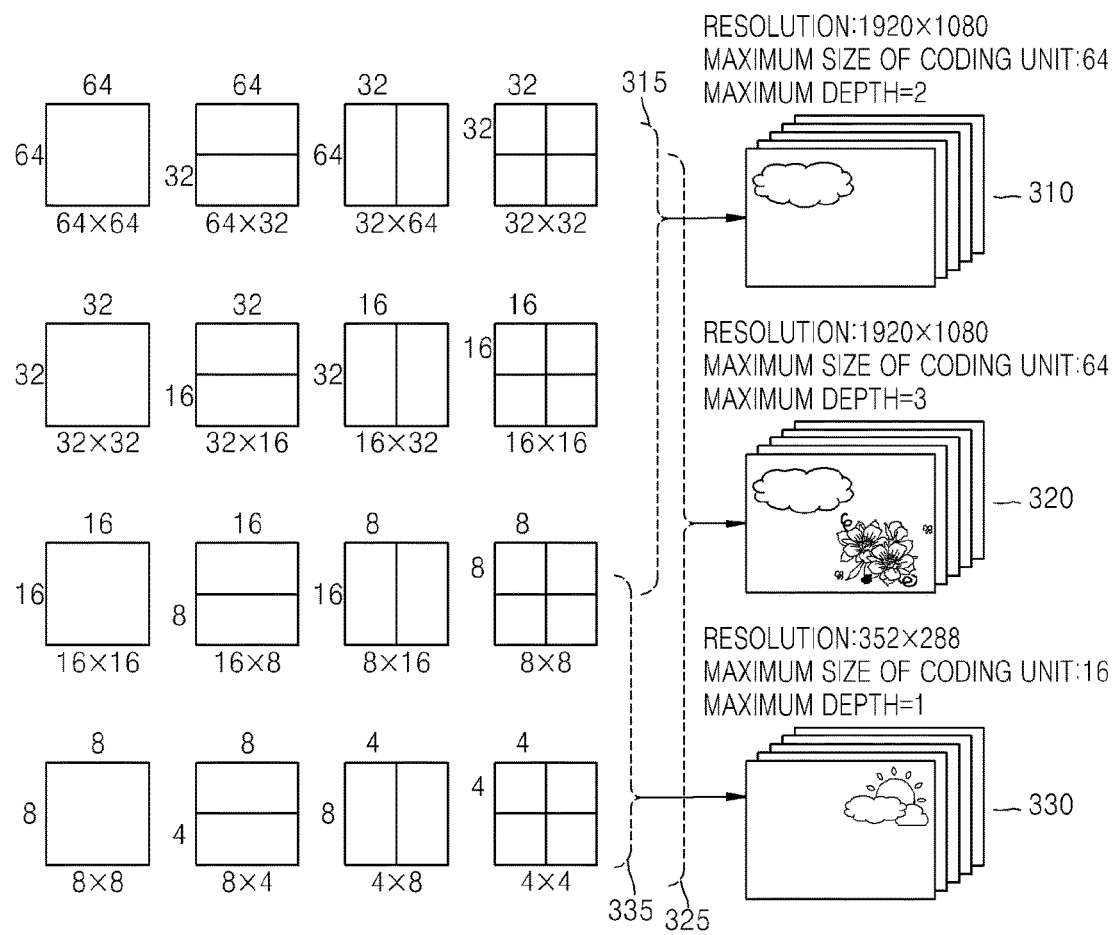
FIG. 11 is a diagram for describing a concept of coding units according to an exemplary embodiment.

FIG. 11 is a diagram for describing a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 11 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 12:
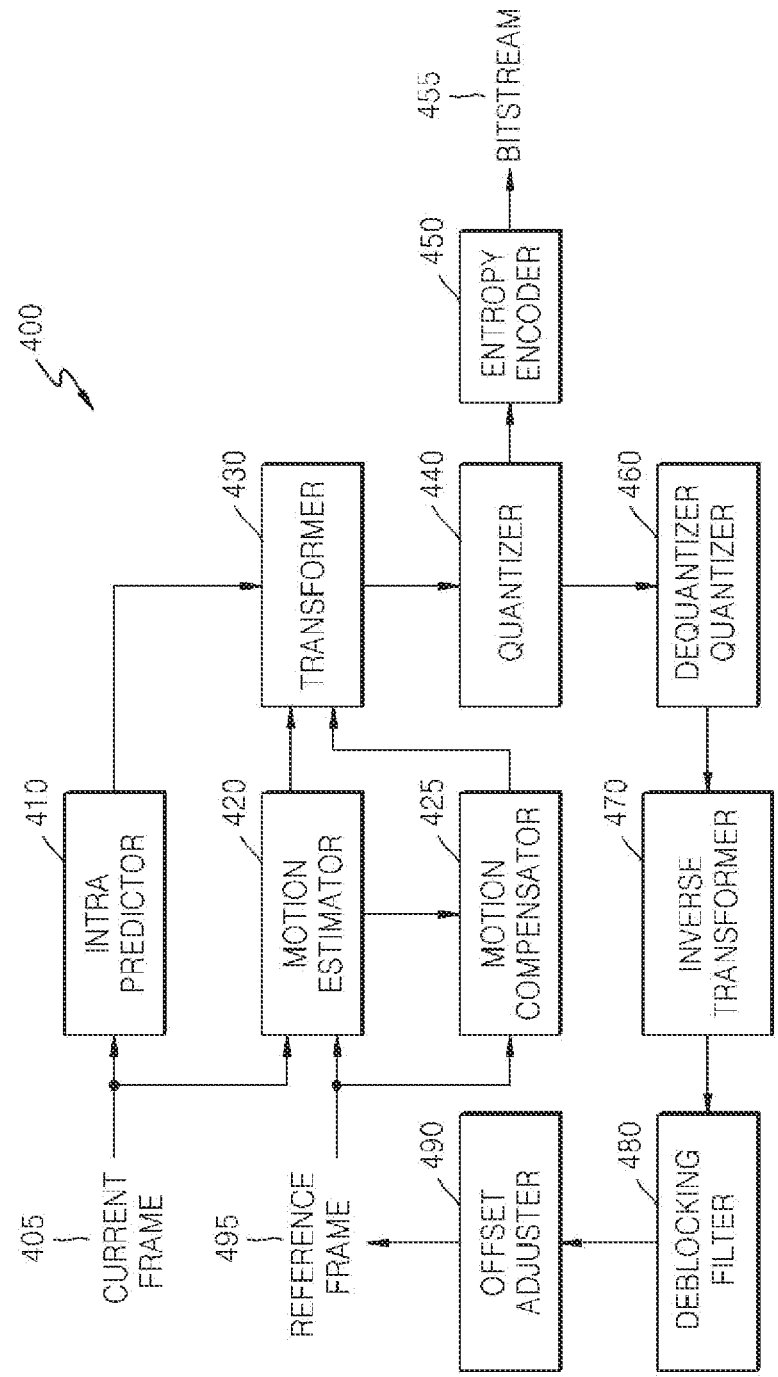
FIG. 12 is a block diagram of an image encoder based on coding units according to an exemplary embodiment.

FIG. 12 is a block diagram of an image encoder 400 based on coding units according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through a dequantizer 460 and an inverse transformer 470, and the restored data in the spatial domain is output as the reference frame 495 after being post-processed through a deblocking unit 480 and a sample adaptive offset (SAO) adjustor 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the dequantizer 460, the inverse transformer 470, the deblocking unit 480, and the SAO adjustor 490 perform operations based on each coding unit among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

In detail, the motion estimator 420 may predict a motion vector of a current prediction unit (partition) by referring to a motion vector of another prediction unit for PU merging or AMVP. The motion estimator 420 may predict a motion vector according to the motion vector prediction method described above with reference to FIGS. 1 through 4B.

The motion estimator 420 may determine a reference motion vector by selecting an optimum candidate motion vector from among candidate motion vectors included in a candidate motion vector list, and predict and determine the motion vector of the current prediction unit by using the reference motion vector. The motion estimator 420 may determine a reference block indicated by the motion vector of the current block in the reference frame 495 of the current prediction unit, and generate residual data between the reference prediction unit and the current prediction unit. Accordingly, the motion estimator 420 may output the residual data according to prediction units.

Also, the motion compensator 425 may predict a motion vector according to the motion vector prediction method described above with reference to FIGS. 1 through 4B, and perform motion compensation by using the motion vector.

The motion compensator 425 may determine a reference prediction unit indicated by a motion vector of the current prediction unit, in the reference frame 495, and the current prediction unit may be restored by synthesizing the reference prediction unit and the residual data of the current prediction unit.

Accordingly, the motion compensator 425 may restore prediction units by performing motion compensation according to prediction units, and restore a current image including the restored prediction units. The restored prediction unit and the restored image may be referred to for another prediction unit and an image.

Figure 13:
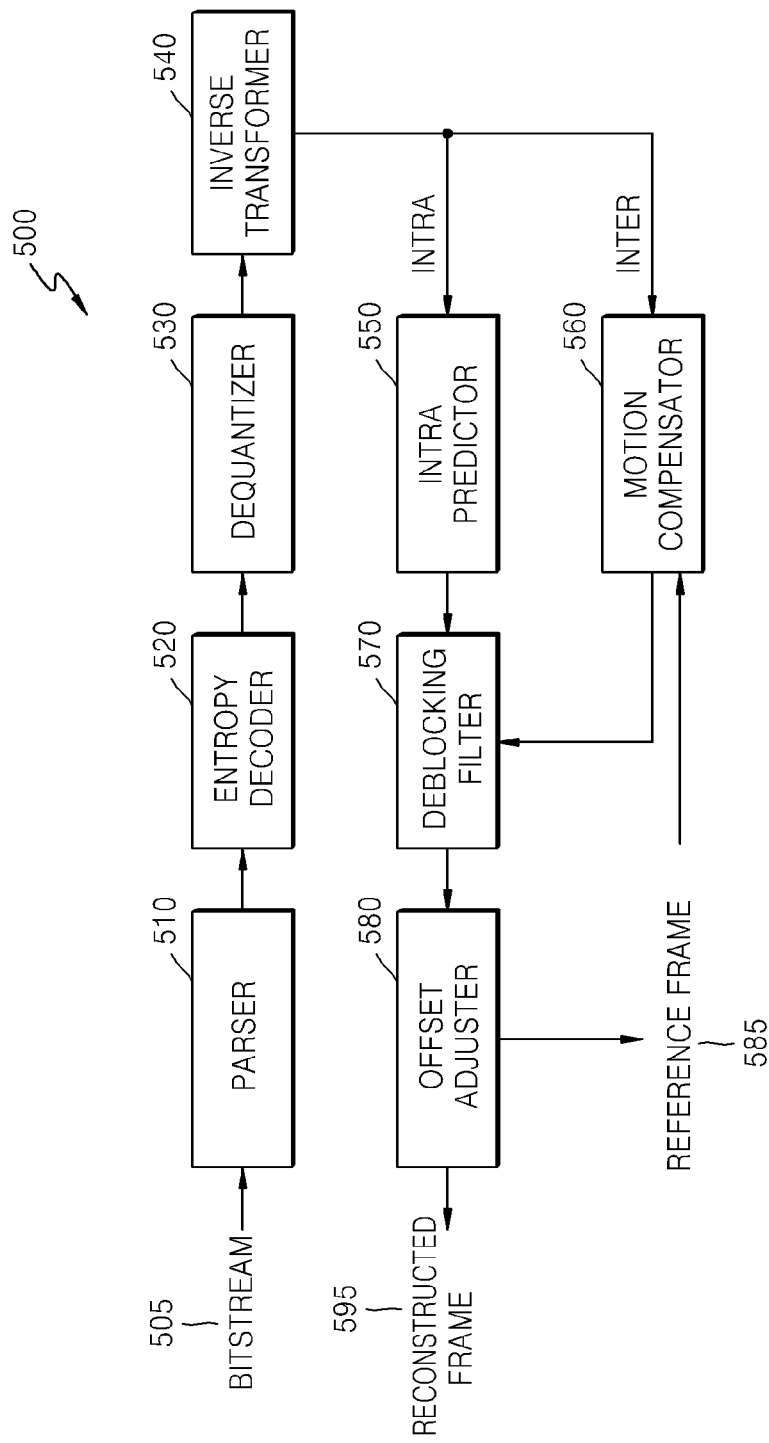
FIG. 13 is a block diagram of an image decoder based on coding units according to an exemplary embodiment.

FIG. 13 is a block diagram of an image decoder 500 based on coding units according to an exemplary embodiment.

A parser 510 parses encoded image data to be decoded and information about encoding required for decoding from a bitstream 505. The encoded image data is output as inverse quantized data through an entropy decoder 520 and a dequantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and an SAO adjustor 580. Also, the image data that is post-processed through the deblocking unit 570 and the SAO adjustor 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the dequantizer 530, the inverse transformer 540, the intra predictor 550, the motion compensator 560, the deblocking unit 570, and the SAO adjustor 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

In detail, the motion compensator 560 may predict a motion vector according to the motion vector prediction method described above with reference to FIGS. 1 through 4B.

The motion compensator 560 may determine the reference frame 585 indicated by POC according to a reference index of a current prediction unit, determine a reference prediction unit indicated by the motion vector of the current prediction unit from the reference frame 585, and restore the current prediction unit by synthesizing the reference prediction unit and residual data of the current prediction unit.

Accordingly, the motion compensator 560 may restore prediction units by performing motion compensation according to prediction units, and generate a restored image including the restored prediction units. The restored prediction unit and the restored image may be referred to for another prediction unit and another image.

Figure 14:
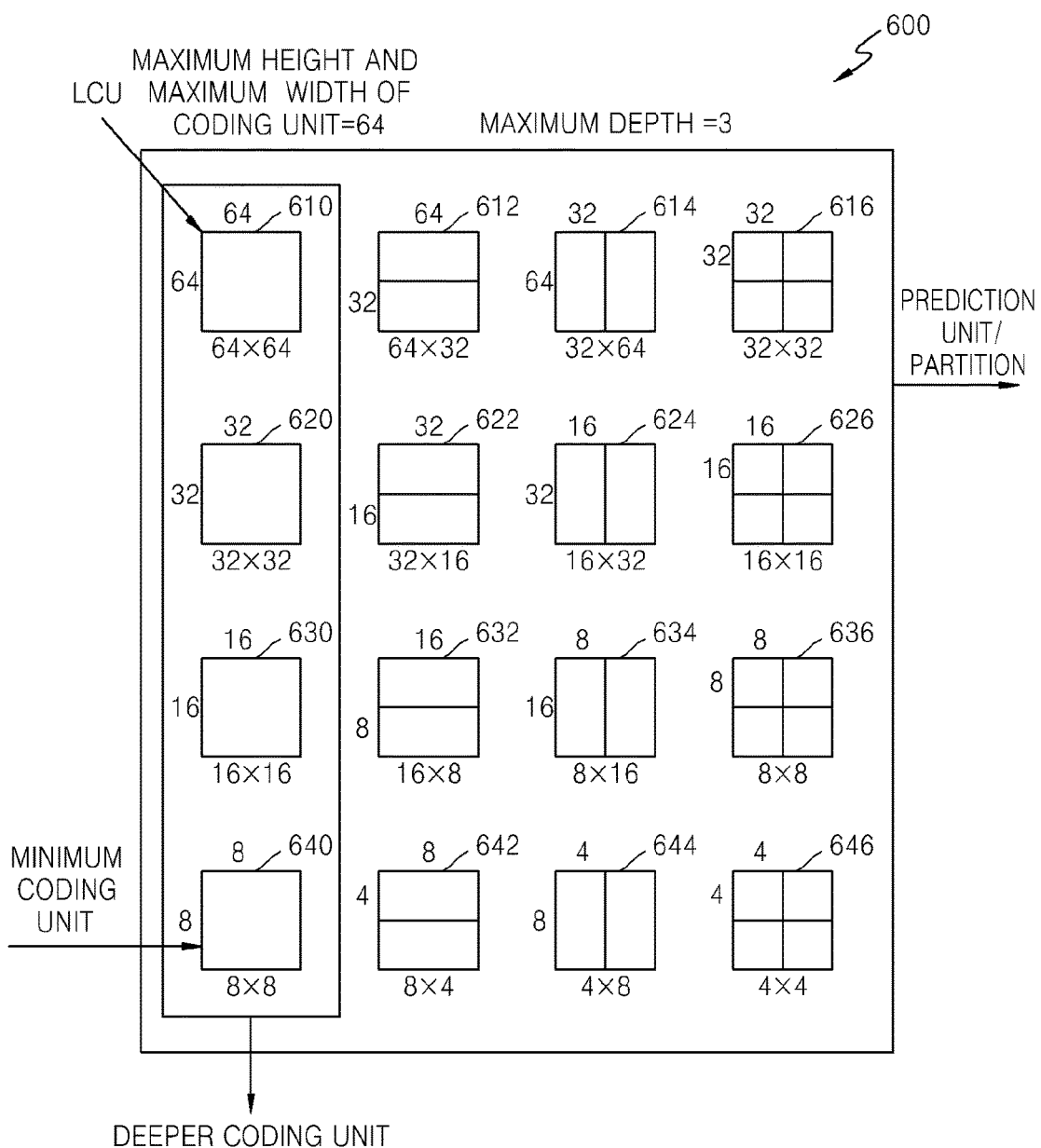
FIG. 14 is a diagram illustrating deeper coding units according to depths, and partitions according to an exemplary embodiment.

FIG. 14 is a diagram illustrating deeper coding units according to depths, and partitions according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth refers to a total number of times the coding unit is split from the maximum coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a coding unit having a lowest depth and a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 15 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 16 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 17:
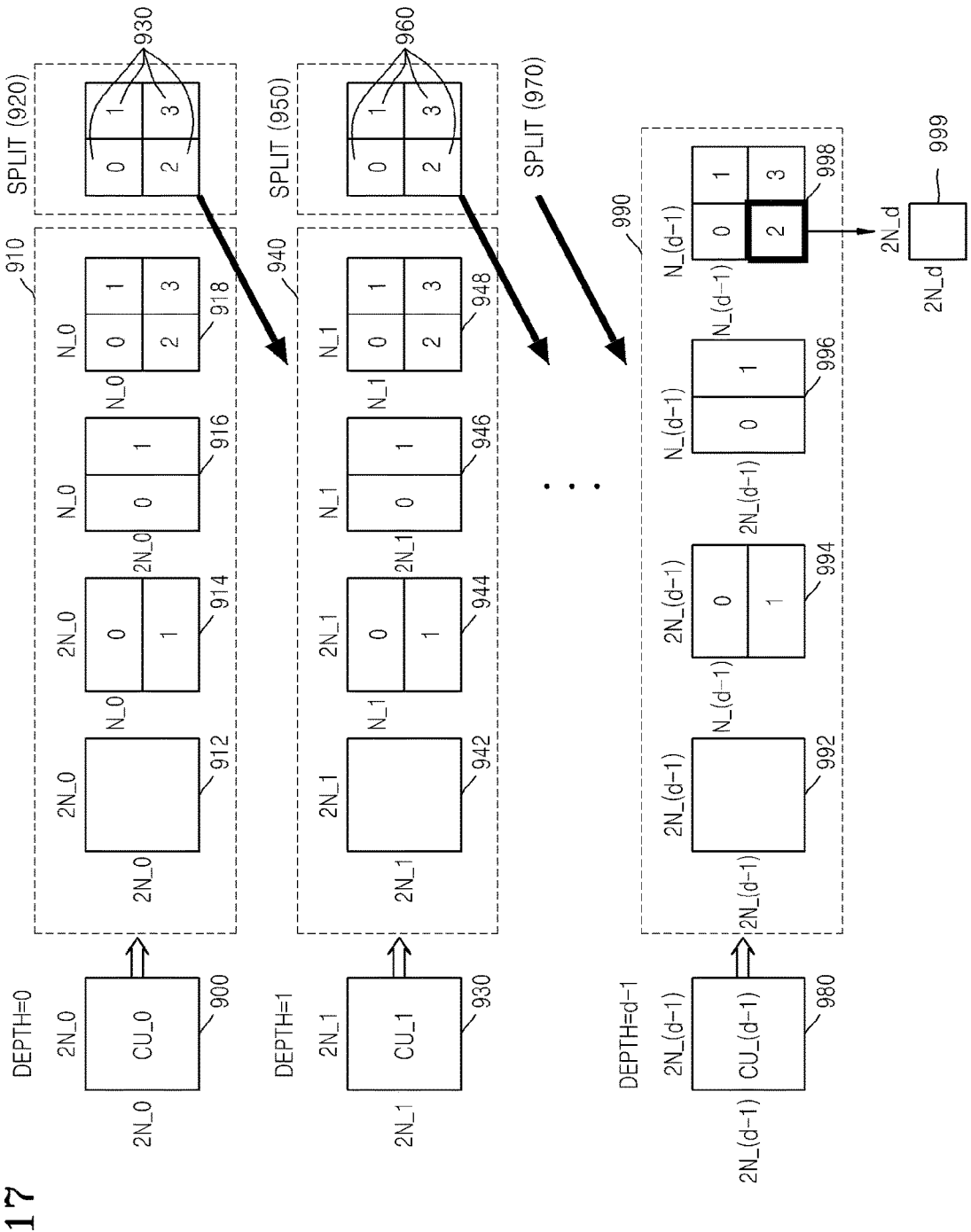
FIG. 17 is a diagram of deeper coding units according to depths, according to an exemplary embodiment.

FIG. 17 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 17 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a square data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition type 912. The video decoding apparatus 200 may determine a depth, in which split information is 0, as a coded depth by using split information according to depths, and use information about an encoding mode of the corresponding depth for decoding.

Figure 18:
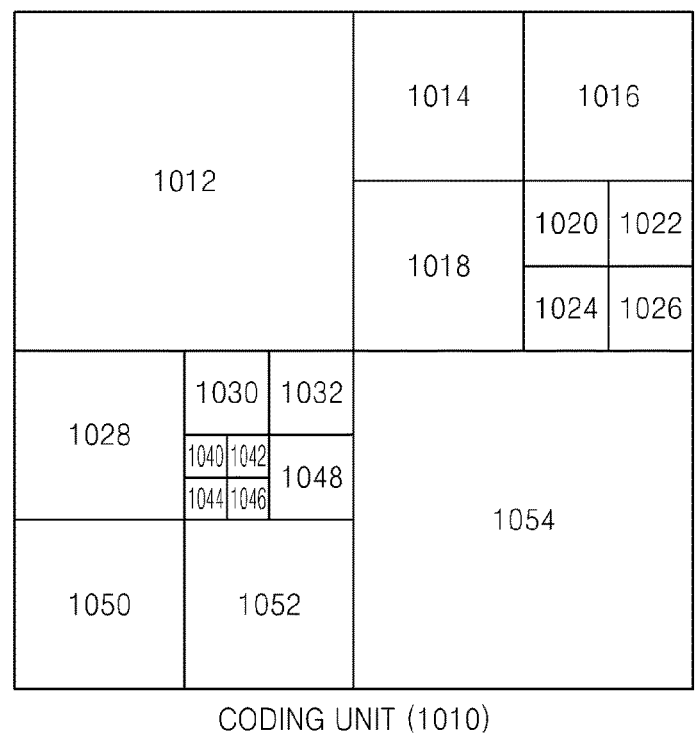
FIGS. 18 through 20 are diagrams for describing a relationship between coding units, prediction units, and transformation units, according to an exemplary embodiment.
Figure 19:
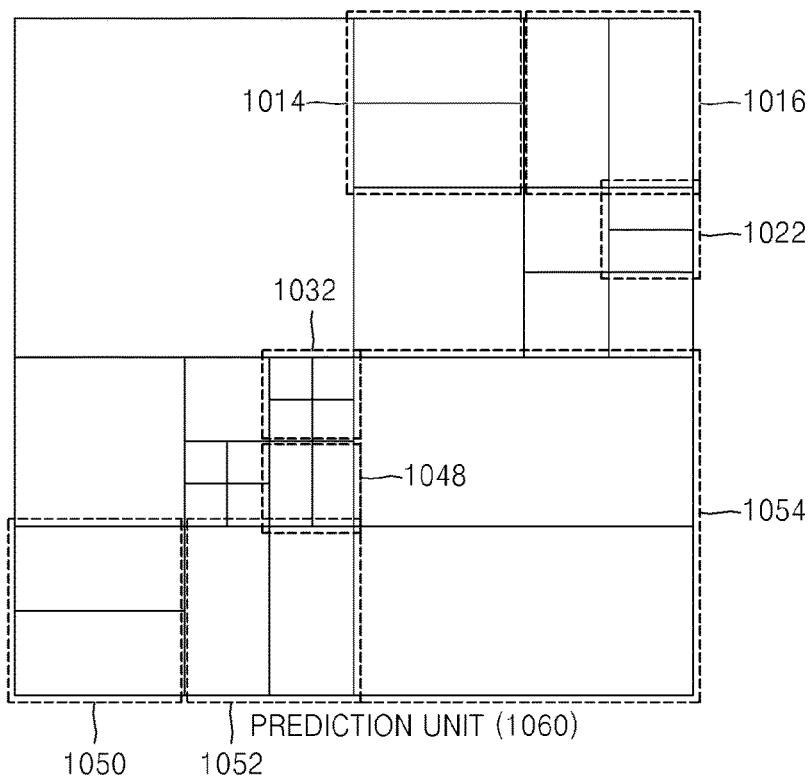
Figure 20:
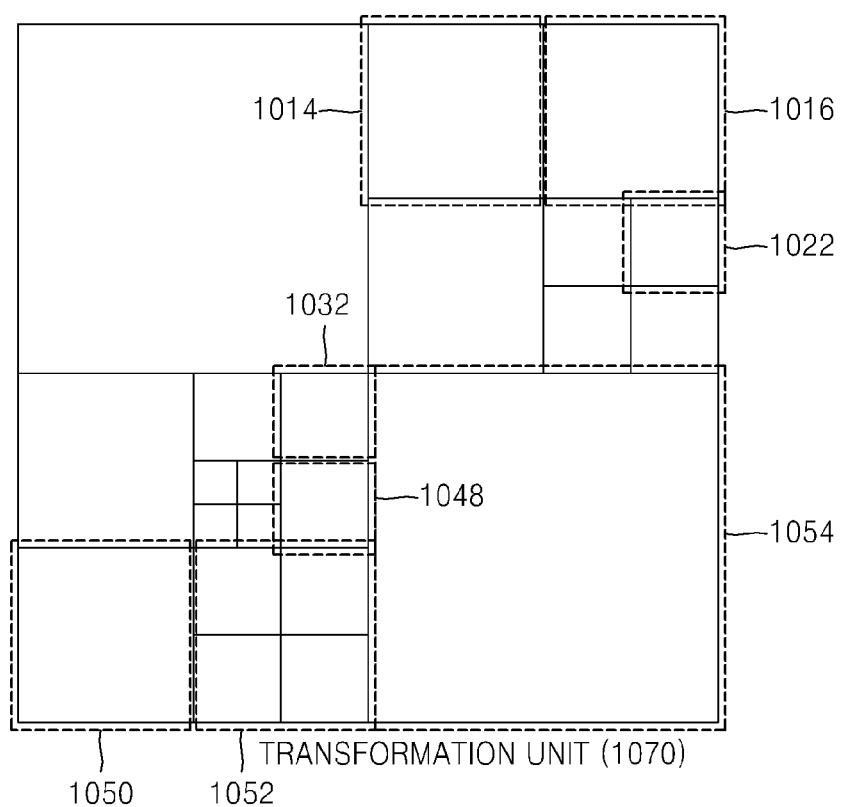

FIGS. 18 through 20 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 21:
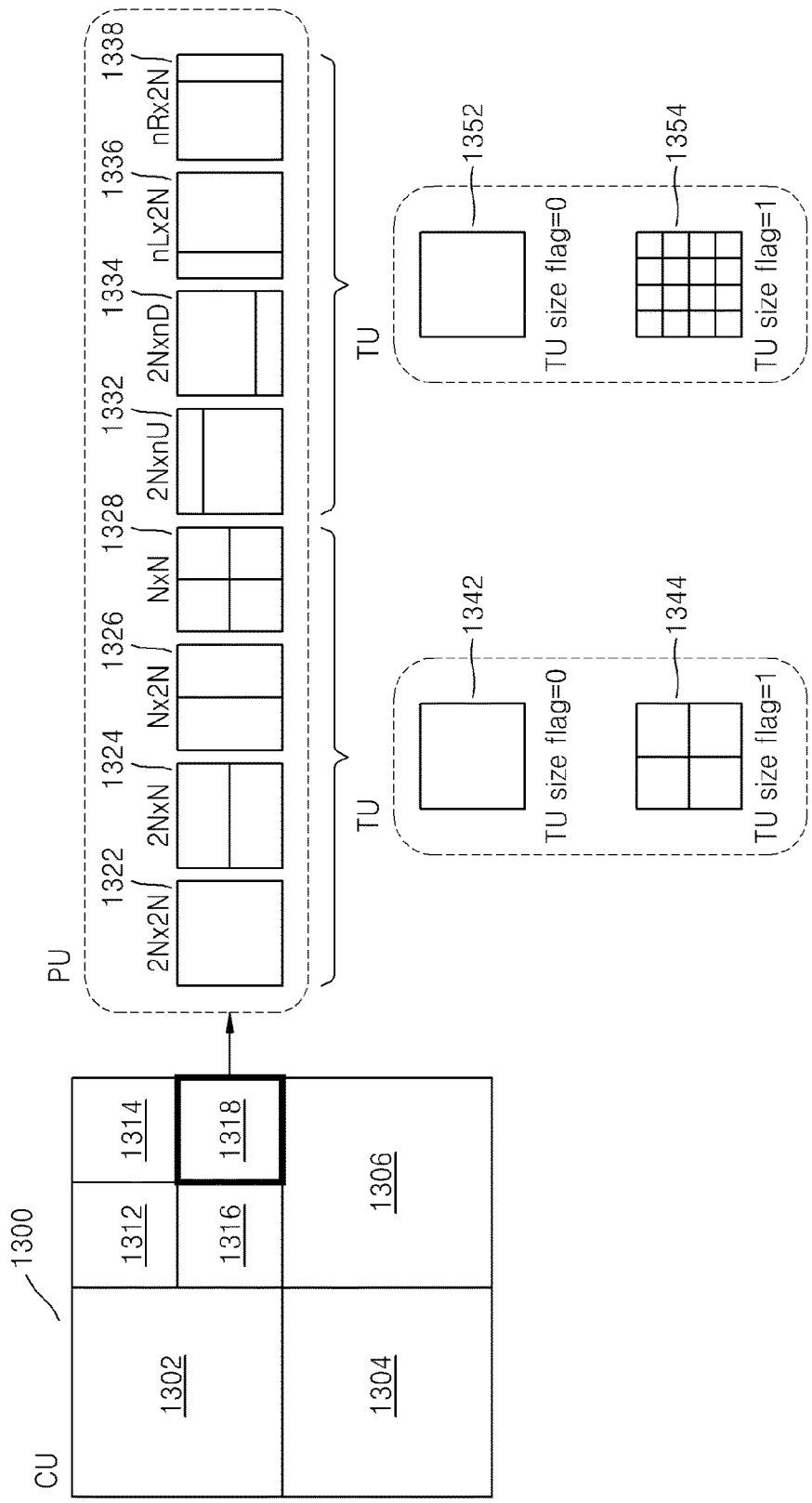
FIG. 21 is a diagram for describing a relationship between a coding unit, a prediction unit, and a transformation unit, according to encoding mode information of Table 1.

FIG. 21 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e., the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 21, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a–1) then the size of a transformation unit may be 32×32 when a TU size flag is 0, (a–2) may be 16×16 when the TU size flag is 1, and (a–3) may be 8×8 when the TU size flag is 2.

As another example, (b) if the size of the current coding unit is 32×32 and a minimum transformation unit size is 32×32, (b–1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and one or more other exemplary embodiments are not limited thereto.

According to the video encoding method based on coding units having a tree structure as described with reference to FIGS. 9 through 21, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

It is understood that one or more exemplary embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the video encoding method according to the motion vector prediction method described with reference to FIGS. 1 through 21, will be collectively referred to as a 'video encoding method according to the present disclosure'. In addition, the video decoding method according to the motion vector prediction method described with reference to FIGS. 1 through 21, will be referred to as a 'video decoding method according to the present disclosure'.

Also, a video encoding apparatus including the inter prediction apparatus 20, the video encoder 70, the video decoder 80, the video encoding apparatus 100, or the image encoder 400, which has been described with reference to FIGS. 1 through 21, will be referred to as a 'video encoding apparatus according to the present disclosure'. In addition, a video decoding apparatus including the inter prediction apparatus 20, the video decoder 80, the video decoding apparatus 200, or the image decoder 500, which has been descried with reference to FIGS. 1 through 21, will be referred to as a 'video decoding apparatus according to the present disclosure'.

A computer-readable recording medium storing a program, e.g., a disc 26000, according to one or more exemplary embodiments will now be described in detail.

Figure 22:
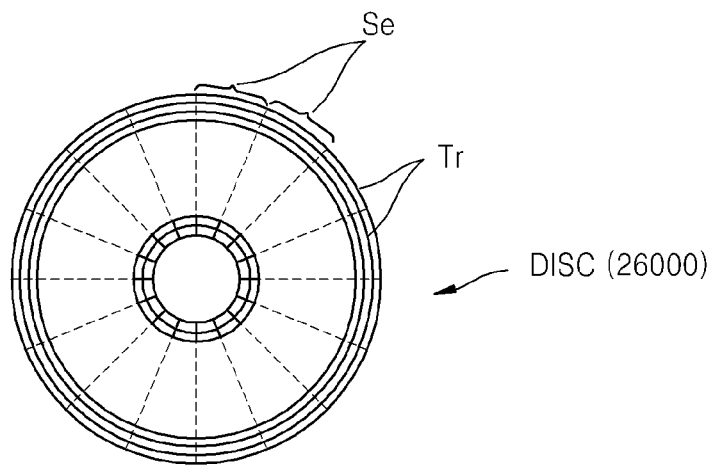
FIG. 22 is a diagram of a physical structure of a disc in which a program is stored, according to an exemplary embodiment.

FIG. 22 is a diagram of a physical structure of the disc 26000 in which a program is stored, according to an exemplary embodiment. The disc 26000, which is a storage medium, may be a hard drive, a compact disc-read only memory (CD-ROM) disc, a Blu-ray disc, a digital versatile disc (DVD), etc. The disc 26000 includes a plurality of concentric tracks Tr that are each divided into a specific number of sectors Se in a circumferential direction of the disc 26000. In a specific region of the disc 26000, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 23.

Figure 23:
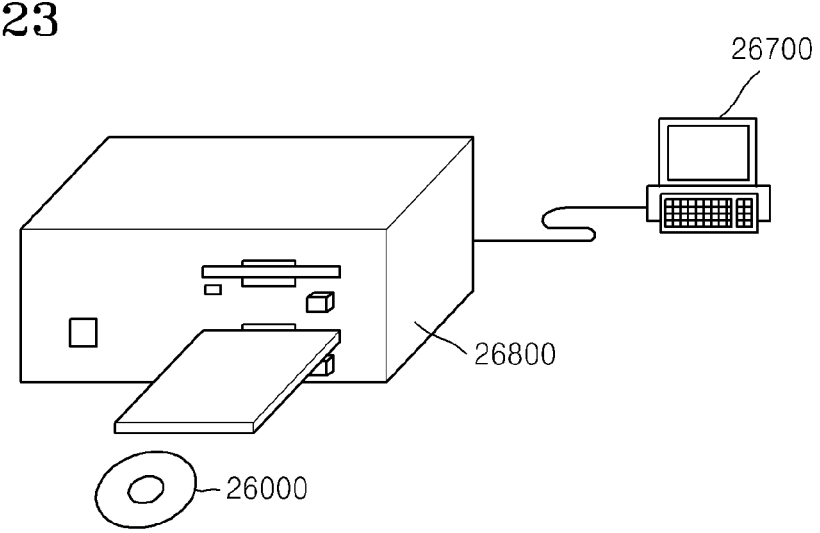
FIG. 23 is a diagram of a disc drive for recording and reading a program by using a disc.

FIG. 23 is a diagram of a disc drive 26800 for recording and reading a program by using the disc 26000. A computer system 26700 may store a program that executes at least one of a video encoding method and a video decoding method according to exemplary embodiments, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one of a video encoding method and a video decoding method according to exemplary embodiments may be stored not only in the disc 26000 illustrated in FIG. 22 or 23 but also in a memory card, a ROM cassette, or a solid state drive (SSD).

A system to which the video encoding method and a video decoding method described above are applied will be described below.

Figure 24:
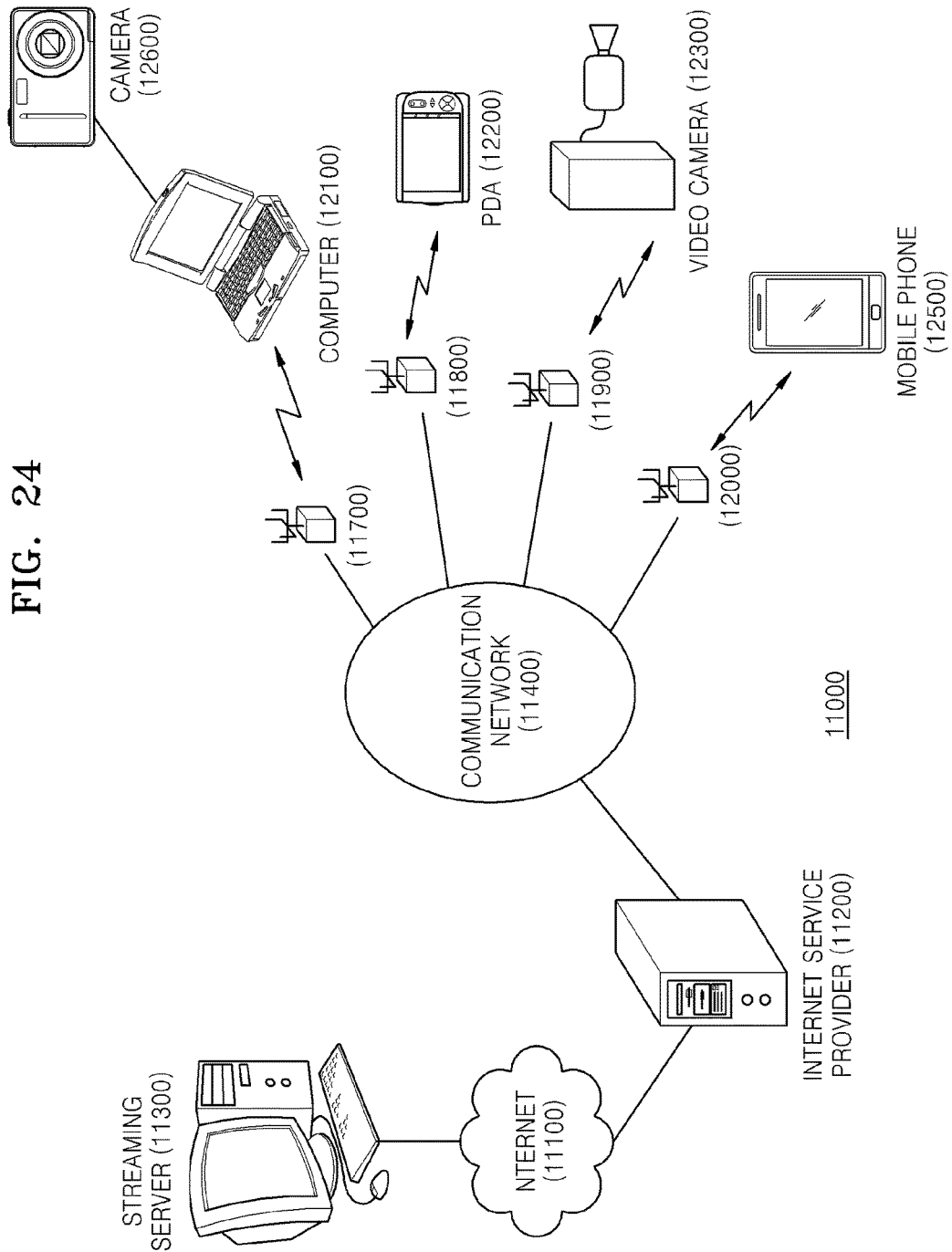
FIG. 24 is a diagram of an overall structure of a content supply system for providing a content distribution service.

FIG. 24 is a diagram of an overall structure of a content supply system 11000 for providing a content distribution service, according to an exemplary embodiment. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 24 and devices may be selectively connected thereto in one or more other exemplary embodiments. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to one or more exemplary embodiments described above.

The mobile phone 12500 included in the content supply system 11000 according to an exemplary embodiment will now be described in greater detail with reference to FIGS. 25 and 26.

Figure 25:
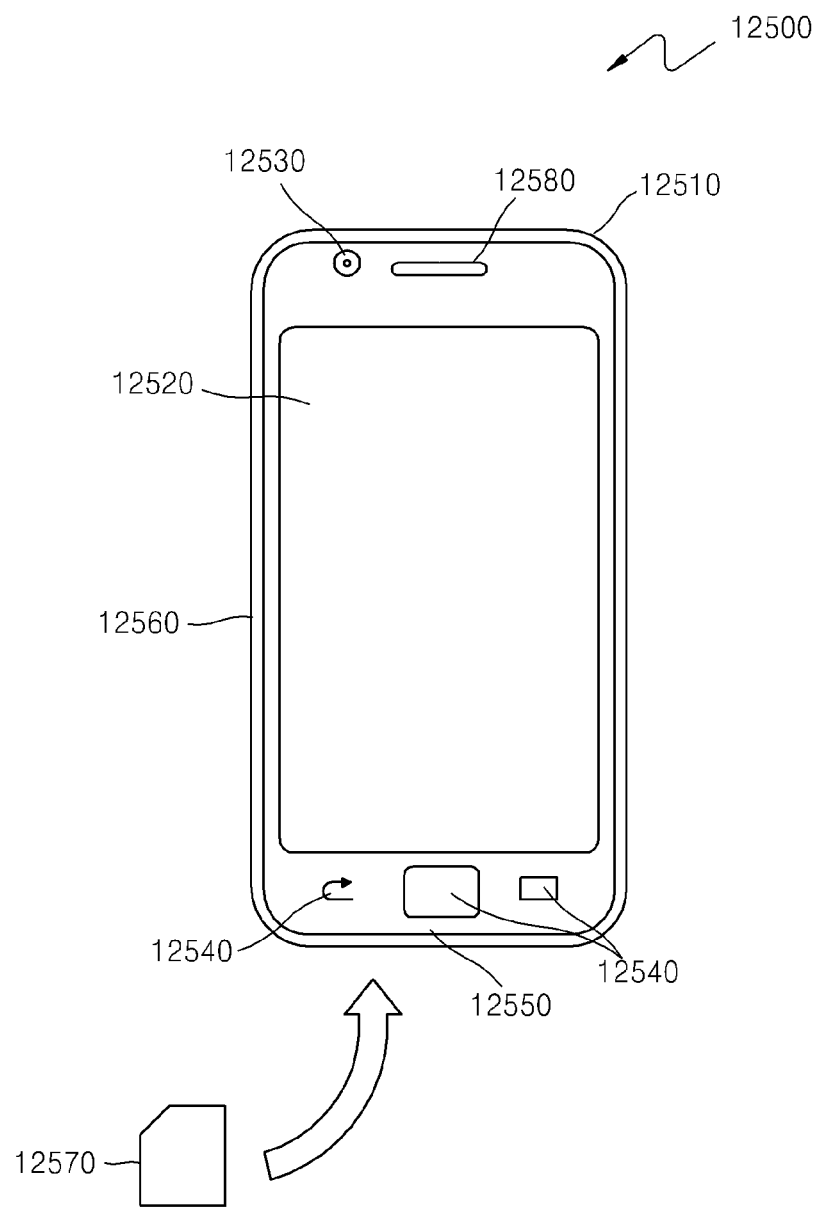
FIGS. 25 and 26 are diagrams respectively of an external structure and an internal structure of a mobile phone to which a video encoding method and a video decoding method are applied, according to an exemplary embodiment.

FIG. 25 illustrates an external structure of the mobile phone 12500 to which a video encoding method and a video decoding method are applied, according to an exemplary embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include: a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case, although it is understood that one or more other exemplary embodiments are not limited thereto.

Figure 26:
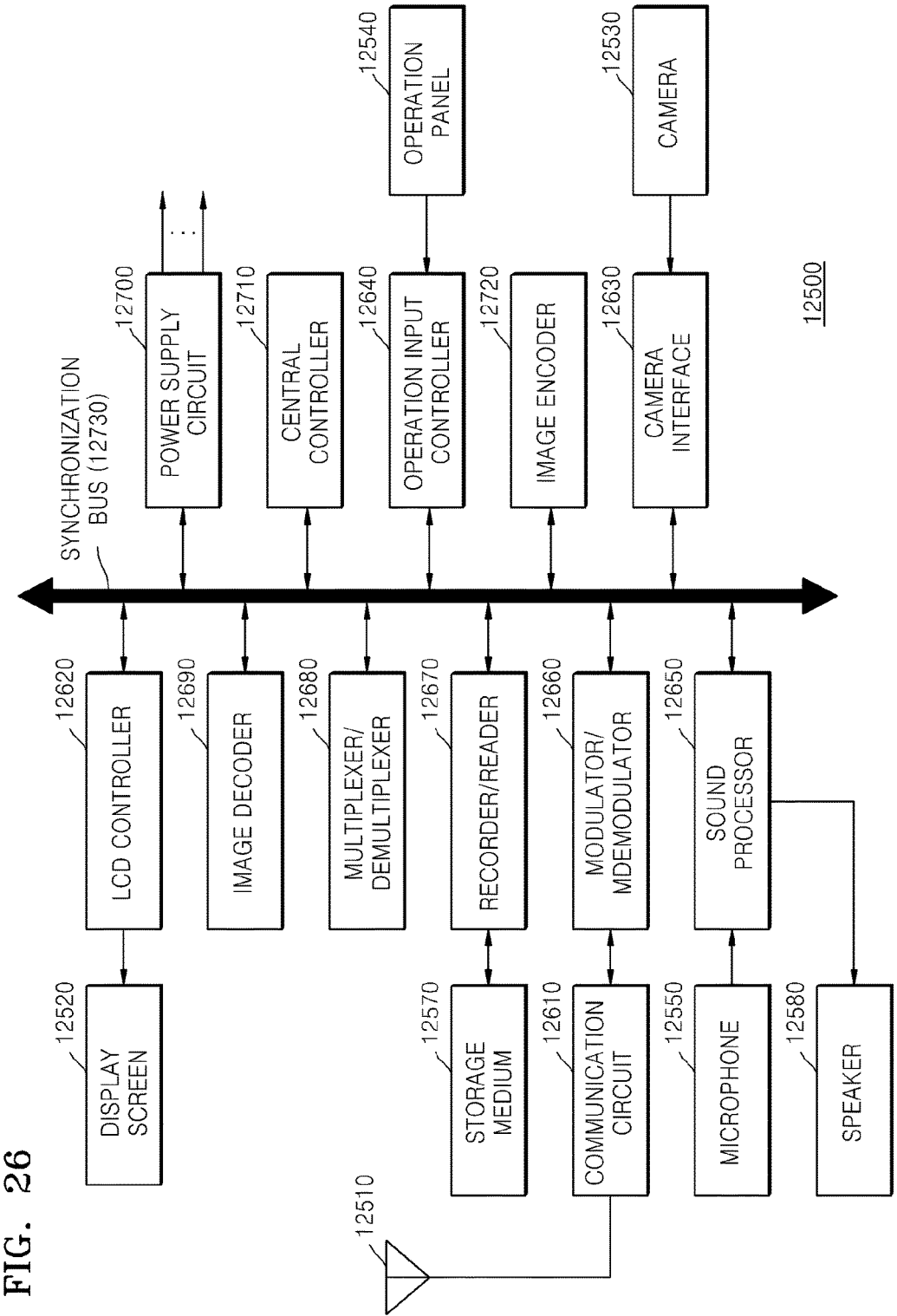

FIG. 26 illustrates an internal structure of the mobile phone 12500, according to an exemplary embodiment. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690 (e.g., image decoder), a multiplexer/demultiplexer 12680, a recording/reading unit 12670 (e.g., recorder/reader), a modulation/demodulation unit 12660 (e.g., modulator/demodulator), and a sound processor 12650 are connected to a central controller 12710 via a synchronization bus 12730.

If a user operates a power button and sets from a 'power off state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., short message service message, email, etc., is transmitted in a data communication mode, text data of the text message is input via the operation panel 12540 and is transmitted to the central controller 12710 via the operation input controller 12640. Under control of the central controller 12710, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain restored video data and provide the restored video data to the display screen 12520 via the LCD controller 12620, according to the video decoding method described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to one or more exemplary embodiments, may be a transceiving terminal including only the video encoding apparatus, or may be a transceiving terminal including only the video decoding apparatus.

Figure 27:
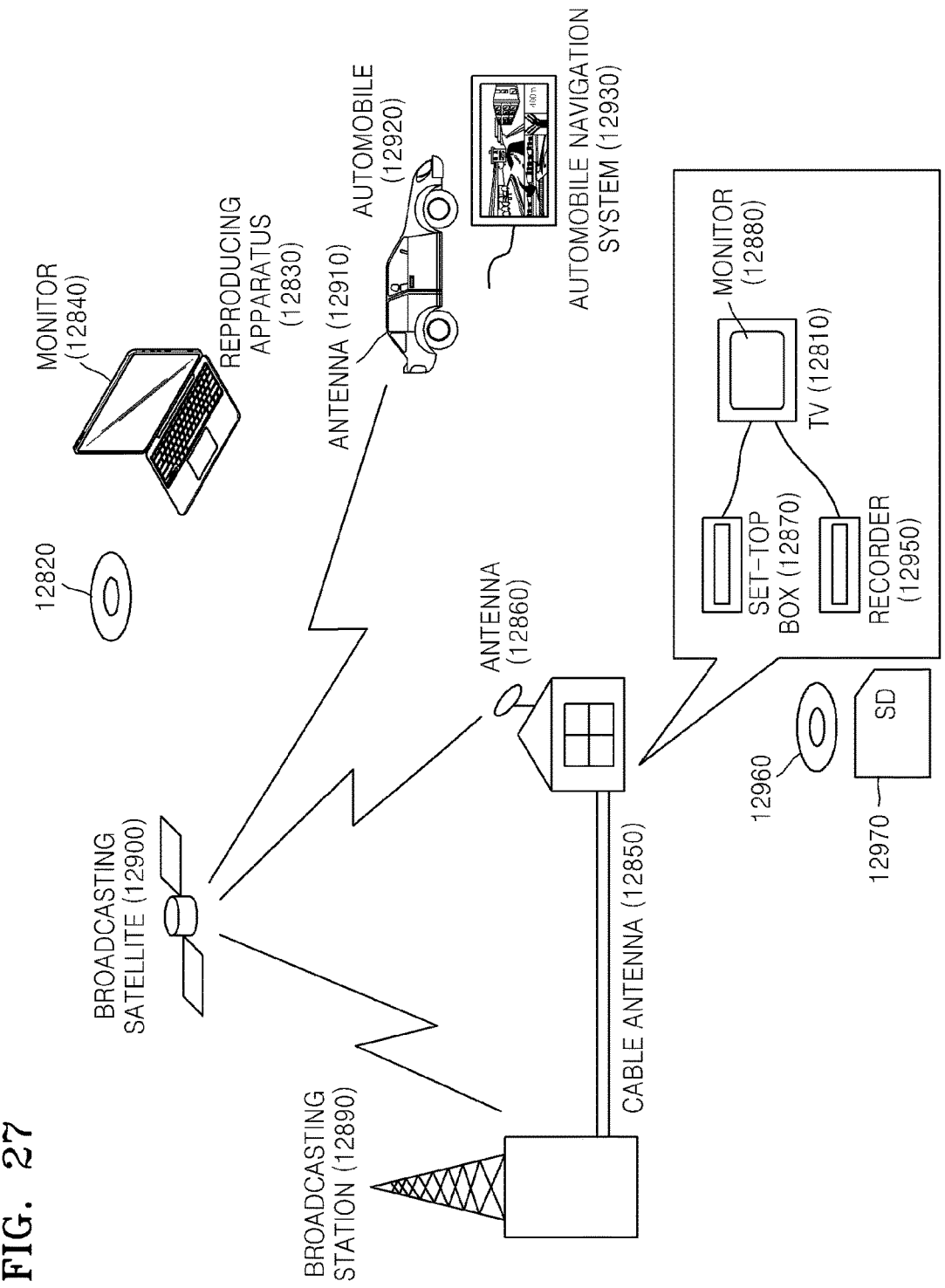
FIG. 27 is a diagram of a digital broadcast system to which a communication system is applied, according to an exemplary embodiment.

A communication system according to an exemplary embodiment is not limited to the communication system described above with reference to FIG. 24. For example, FIG. 27 illustrates a digital broadcasting system employing a communication system, according to an exemplary embodiment. The digital broadcasting system of FIG. 27 may receive a digital broadcast transmitted via a satellite or a terrestrial network by using a video encoding apparatus and a video decoding apparatus according to one or more exemplary embodiments.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to exemplary embodiments may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 24. For example, the computer 12100 and the TV receiver 12810 may not be included in the camera 12530, the camera interface 12630, and the image encoding unit 12720 of FIG. 24.

Figure 28:
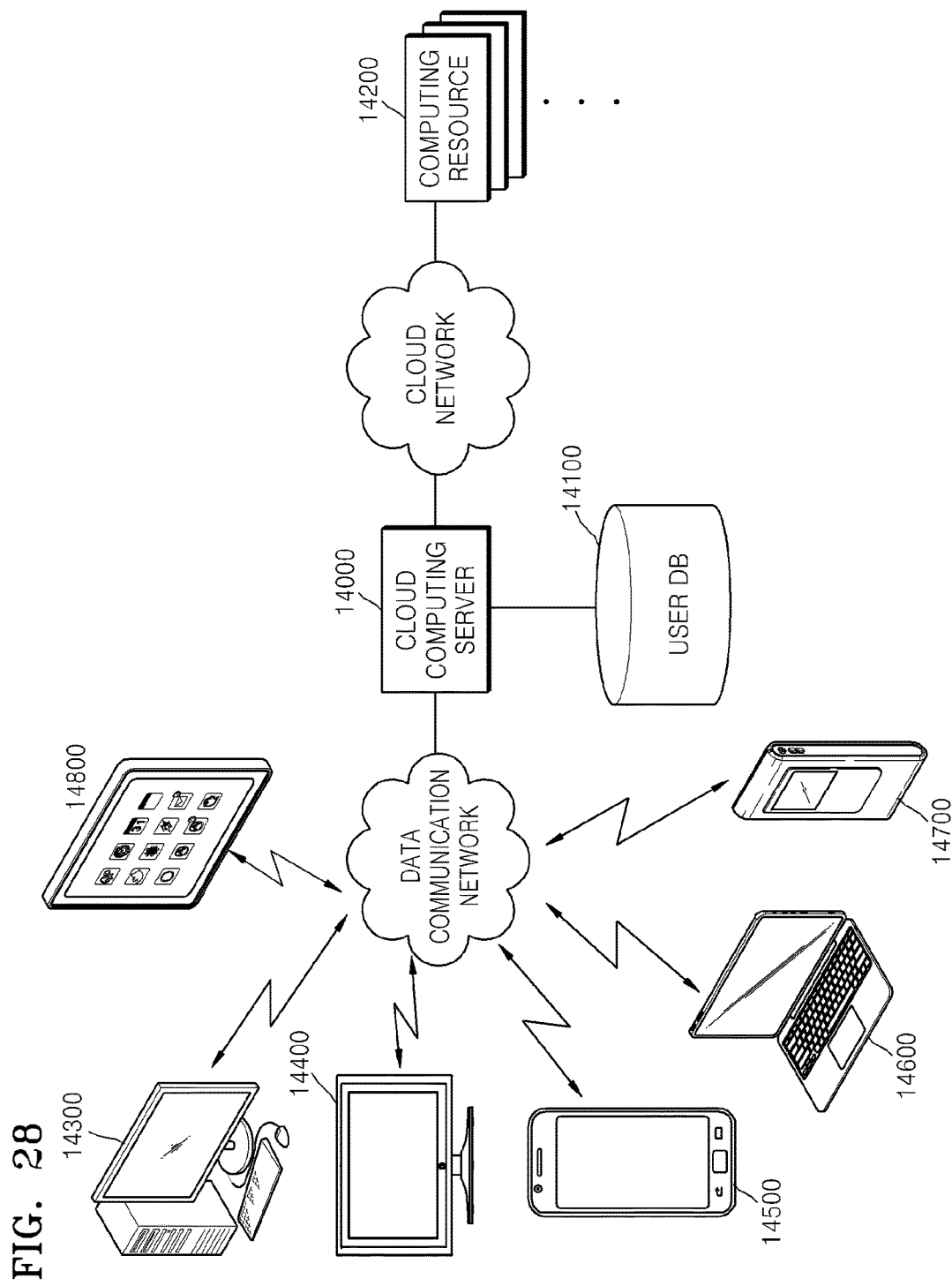
FIG. 28 is a diagram illustrating a network structure of a cloud computing system using a video encoding apparatus and a video decoding apparatus, according to an exemplary embodiment.

FIG. 28 is a diagram illustrating a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, personal credit information, etc., of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, operations of reproducing video by decoding the video data stream are similar to operations of the mobile phone 12500 described above with reference to FIG. 21.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1 to 23. As another example, the user terminal may include a video encoding apparatus as described above with reference to FIGS. 1 to 23. Alternatively, the user terminal may include both the video decoding apparatus and the video encoding apparatus as described above with reference to FIGS. 1 to 23.

Various applications of a video encoding method, a video decoding method, a video encoding apparatus, and a video decoding apparatus according to exemplary embodiments described above with reference to FIGS. 1 to 23 have been described above with reference to FIGS. 22 to 28. However, methods of storing the video encoding method and the video decoding method in a storage medium or methods of implementing the video encoding apparatus and the video decoding apparatus in a device, according to various exemplary embodiments, are not limited to the exemplary embodiments described above with reference to FIGS. 22 to 28.

While exemplary embodiments have been particularly shown and described above, it will be understood by those of ordinary skill in the art that various changes in form and details may be made therein without departing from the spirit and scope according to the present disclosure as defined by the following claims.

The invention claimed is:

1. A method of decoding an image, the method comprising:
    determining a collocated picture from among pictures restored before a current picture according to a collocated index;
    parsing information about a long-term reference picture from a bitstream;
    when one of a reference picture of a collocated block included in the collocated picture and a reference picture of a current block is determined as a long-term reference picture, and the other one of the reference picture of the collocated block and the reference picture of the current block is determined as a short-term reference picture based on the information about the long-term reference picture, determining that a motion vector of the collocated block is un-available so that the motion vector of the collocated block is not used to predict a motion vector of the current block;
    when both of the reference picture of the collocated block and the reference picture of the current block are determined as long-term reference pictures based on the information about the long-term reference picture, obtaining a temporal motion vector prediction candidate without scaling the motion vector of the collocated block;
    receiving prediction information of a candidate block as prediction information of the current block that indicates the candidate block used to derive a motion vector predictor of the current block;
    determining the motion vector predictor of the current block from among motion vector prediction candidates, comprising the temporal motion vector prediction candidate, based on the prediction information of the candidate block; and
    generating the motion vector of the current block using the motion vector predictor,
    wherein the scaling is based on a ratio of a distance (Td) between the collocated picture and the reference picture of the collocated block and a distance (Tb) between the current picture and the reference picture of the current block.

2. The method of claim 1, wherein the determining of the motion vector predictor comprises storing the motion vector prediction candidates in a candidate motion vector list.

* * * * *